United States Patent [19]
Dougherty et al.

[11] Patent Number: 5,943,476
[45] Date of Patent: Aug. 24, 1999

[54] METHOD AND APPARATUS FOR REMOTELY SENSING ORIENTATION AND POSITION OF OBJECTS

[75] Inventors: Edmond J. Dougherty, Strafford, Pa.; George R. Simmons, III, Haddon Heights, N.J.

[73] Assignee: August Design, Inc., Ardmore, Pa.

[21] Appl. No.: 08/662,594

[22] Filed: Jun. 13, 1996

[51] Int. Cl.[6] .......................... G05B 15/00; G05B 19/04
[52] U.S. Cl. .............................. 395/94; 395/86; 395/97
[58] Field of Search ................................ 395/94, 97, 86; 364/513, 474.28; 318/568.11; 359/877; 345/158

[56] References Cited

U.S. PATENT DOCUMENTS

| | | | |
|---|---|---|---|
| 4,146,924 | 3/1979 | Birk et al. | 395/94 |
| 4,639,878 | 1/1987 | Day et al. | 395/94 |
| 4,672,564 | 6/1987 | Egli et al. | 702/153 |
| 4,873,651 | 10/1989 | Raviv | 364/513 |
| 4,939,439 | 7/1990 | Dalglish | 318/568.1 |
| 4,942,539 | 7/1990 | McGee et al. | 395/88 |
| 4,965,499 | 10/1990 | Taft et al. | 318/568.11 |
| 5,154,561 | 10/1992 | Lee | 414/138.3 |
| 5,574,479 | 11/1996 | Odell | 345/158 |
| 5,576,901 | 11/1996 | Hanchett | 359/877 |
| 5,784,282 | 7/1998 | Abitbol et al. | 364/474.28 |

*Primary Examiner*—William Grant
*Assistant Examiner*—Carolyn T. Baumgardner
*Attorney, Agent, or Firm*—Panitch Schwarze Jacobs & Nadel, P.C.

[57] ABSTRACT

A system for determining position and orientation of a stationary or moving object projects beams of electromagnetic waves, such as light, onto the object. The beams make lines on the object. A camera senses reflections of the lines. The reflections are converted into pixel data which are used to determine the position and orientation of the object relative to a predetermined coordinate system. The system can also maneuver a robot end effector to the object's position and orientation by interactively viewing representations of the object's position and orientation, and the end effector on a computer screen.

18 Claims, 34 Drawing Sheets

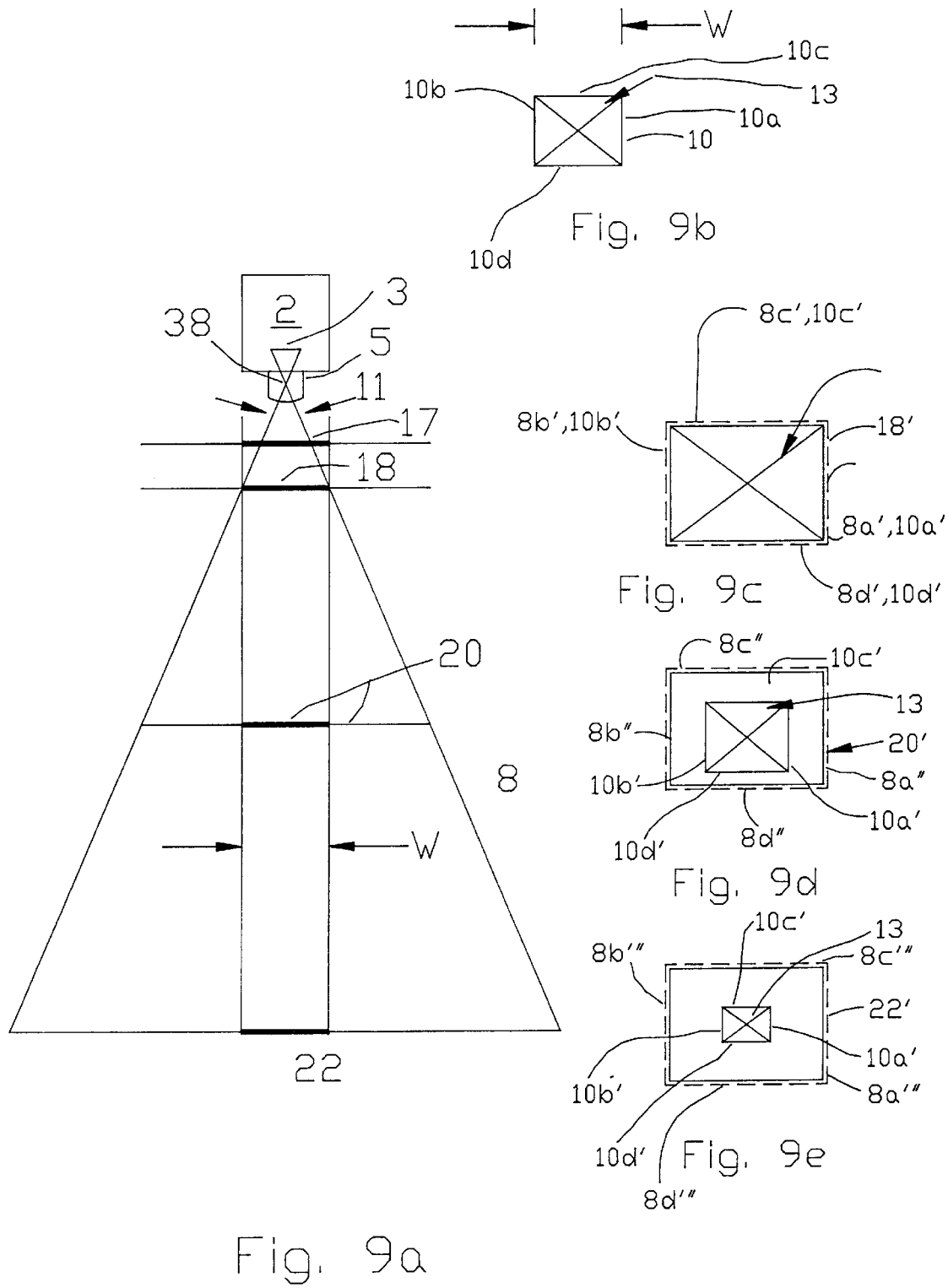

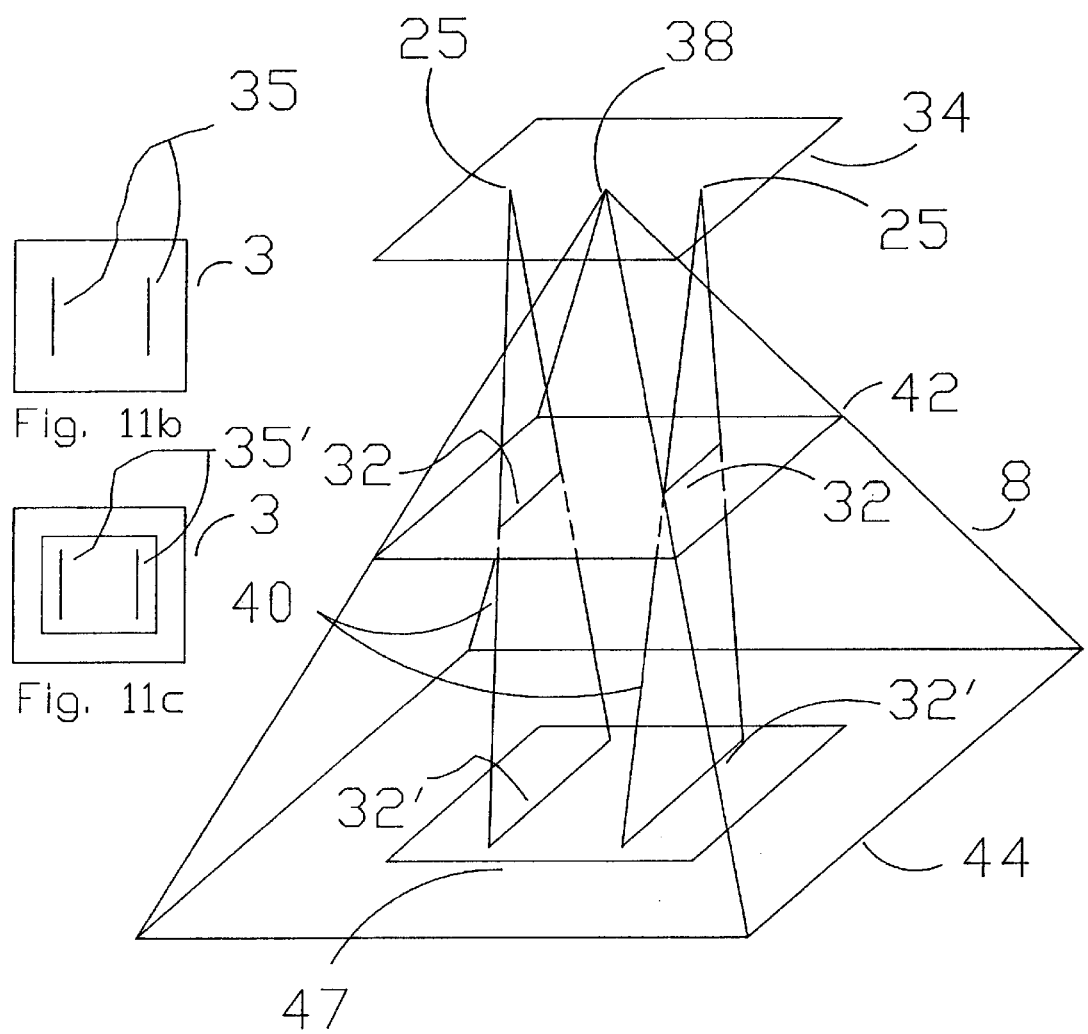

SENSING PITCH
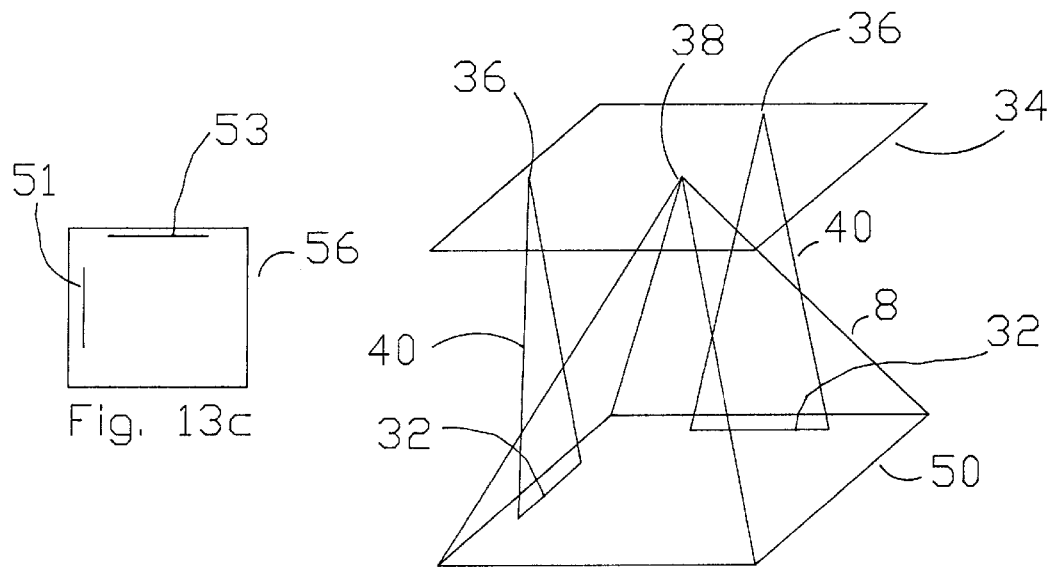
Fig. 13c
Fig. 13a
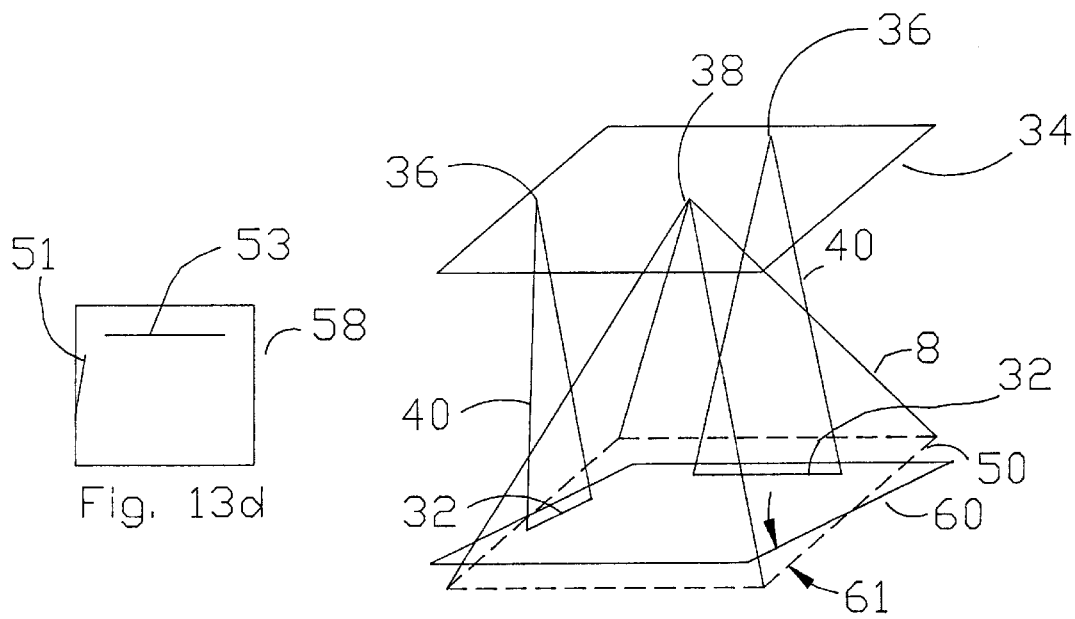
Fig. 13d
Fig. 13b

SENSING ROLL
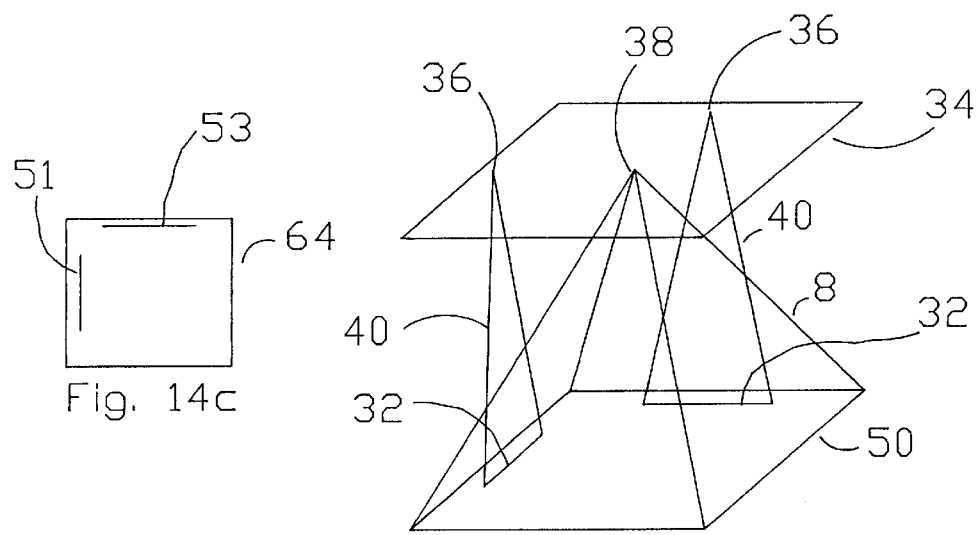
Fig. 14c
Fig. 14a
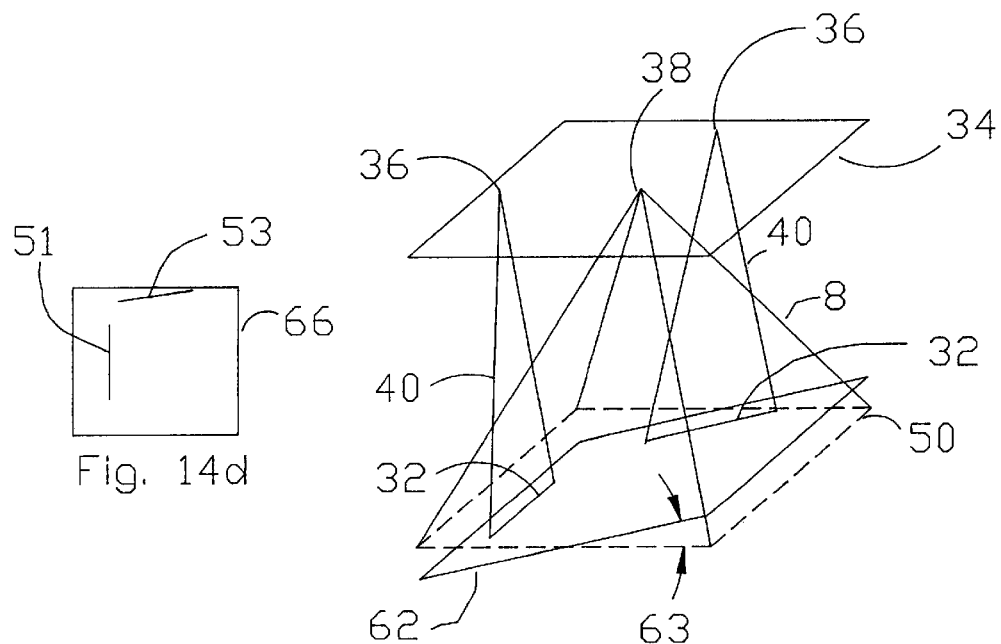
Fig. 14d
Fig. 14b

DETECTING/CONNECTING "YAW"
(ROTATION ABOUT Z AXIS)

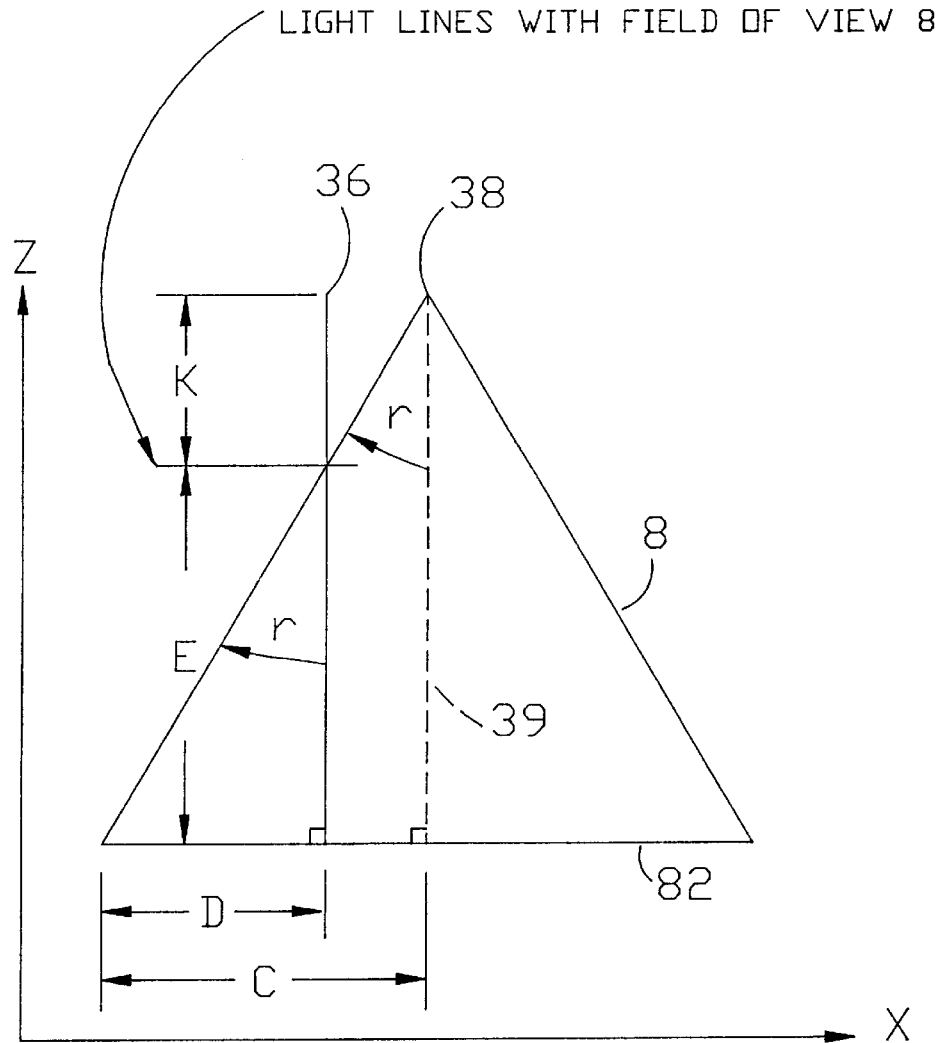
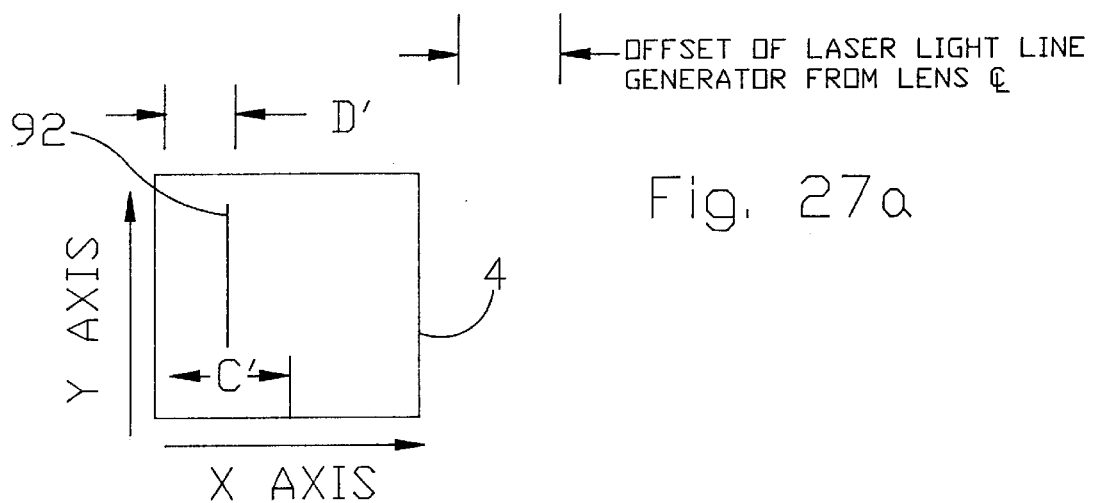
Fig. 27a
Fig. 27b

METHOD AND APPARATUS FOR REMOTELY SENSING ORIENTATION AND POSITION OF OBJECTS

GOVERNMENT RIGHTS

This invention was made with U.S. Government support under U.S. Army contract DAAK70-88-C-0020 and the U.S. Government may therefore have certain rights in the invention.

FIELD OF THE INVENTION

This invention relates generally to navigation, specifically to determining position and orientation of objects from a remote location with respect to a coordinate system referenced to such remote location.

BACKGROUND OF THE INVENTION

Navigational problems, specifically determining the position and orientation of objects and controlling and changing the position and orientation of such objects, exist in many areas of personal and commercial endeavor: As one example, off-loading containerized cargo from large ocean-going ships and lighters is hazardous and inefficient during moderate seas, and almost impossible during periods of rough weather and high seas. Conventional cargo handling systems cannot cope with relative motion between ships and lighters under such conditions.

In space exploration, docking spacecraft presents a difficult problem, requiring either a man in the control loop or an extremely sophisticated control system for sensing position of a first space vehicle with which a second space vehicle is to be docked. Present radar and vision-based systems, while adequate to detect distance between two space vehicles to be docked, cannot detect position or orientation of the second vehicle with respect to the first vehicle.

Aircraft landing, especially rotary winged aircraft landing on moving platforms presented by ships, presents a difficult navigational and positioning problem. Currently used radar-based systems are adequate to some degree to detect distance between the helicopter and the landing platform, but provide no information with respect to helicopter orientation vis-a-vis the landing platform. Systems with a person-in-the-loop may detect orientation of the helicopter with respect to the landing platform, but many times fail, especially in bad weather or darkness, to accurately detect distance between the helicopter and the landing platform.

Materials handling similarly presents navigational and positioning problems. Aligning girders during construction of skyscraper framework presents a difficult navigational and positioning problem that is currently solved visually by human operators. The imprecision involved in visual alignment of girders in constructing skyscrapers can lead to an off-specification girder frame, thereby contributing to structural weakness and difficulty in constructing the remainder of the building which is mounted on the girder frame.

Alignment of robotic end effectors or tools with respect to randomly oriented workpieces used in machining and other manufacturing environments also presents a difficult navigational and positioning problem. Current ultrasonic and microwave systems provide some indication of relative distance between a robotic end effector and a workpiece, but present no information with respect to orientation of the effector relative to the workpiece. This has inhibited application of robotic technology in environments less structured than conventional assembly lines.

Remote measurement of ocean waves and earth topological features similarly presents a difficult navigational and positioning problem. Radar and sonar-based systems are only partially effective in measuring distance between a remote sensor and ocean waves or land features. Current radar and sonar-based systems only provide position data when triangulation techniques are used. Triangulation techniques require multiple sending or receiving stations at fixed positions with respect to one another, with high resultant costs.

In computer modeling of time and motion, measurement of three-dimensional objects to provide input data, which is required before computation can be initiated, is a continuing problem. Current techniques measure three-dimensional objects using hand or caliper measurement tools, convert the measured data into machine-readable form and provide such data to a computer. The multiple steps involved make this a cumbersome process.

Visually impaired persons have difficulty walking or otherwise navigating, especially in darkness. Visually impaired and blind persons using canes are limited somewhat in their speed of walking by length of the cane. The longer the cane, the more difficult it is to maneuver. Difficulties encountered in maneuvering the cane detract from the blind or visually impaired person's ability to process information received in a tactile manner from the cane while walking.

There is still a need for an improved system to determine position and orientation of a remote object with respect to a reference coordinate system, especially when one or both of the objects are moving relative to the other. The present invention fills this need.

SUMMARY OF THE INVENTION

In one embodiment of the invention, a method is provided wherein electromagnetic beams, preferably in the visible spectrum, are projected onto a surface of a remote object for which position is to be determined. Reflections of the electromagnetic beams from the object are sensed and converted into corresponding mathematical representations. The mathematical representations are processed to provide coordinate data defining position and orientation of the remote object relative to a reference coordinate system.

In another embodiment of the invention, an apparatus is provided which includes means for projecting electromagnetic beams onto a surface of an object for which position and orientation is to be determined. The apparatus further provides a sensor collecting the electromagnetic beams as reflected to the sensor by the object for which position and orientation are to be determined. The apparatus further includes means for converting the sensed reflected electromagnetic beams into data representative thereof. A processor operates on the data according to predetermined mathematical criteria and formulae to provide position and orientation information defining location and orientation of the remote object relative to the reference coordinate system.

In yet another particular embodiment of the invention, method and apparatus are provided for remotely sensing relative attitude of objects, specifically cargo containers on ship decks, to stabilize offloading interfaces between ships and lighters, which are used to convey the containers from the ship deck to a desired remote location, up to sea state 4. In this embodiment, the invention maneuvers a robotic end effector, which is fixedly connected to apparatus of lifting and maneuvering a container located on a ship, into a position and orientation corresponding to the position and orientation of the remote container, for moving the container. The apparatus projects electromagnetic beams onto the remote container to form lines which when reflected by the remote container are viewed by a camera. The apparatus converts the reflections into data elements which are referenced to a coordinate system and stores the data elements in a computing device memory. A computer program in the computing device converts the data elements into binary code referenced to a coordinate system and interprets the binary code to determine orientation and position of the remote container once the orientation and position of the container is defined, the container can be transferred from the container ship to a lighter.

When the apparatus and method of the invention are used to move such cargo containers, the apparatus of the invention can operate from an independent floating platform, the deck of a container ship, from a beach, or from a pier. The method and apparatus of the invention improve productivity and safety of container handling.

Although the method and apparatus of the invention have principal application for use in locating and transporting shipping containers to or from ships at sea in rough weather, the method and apparatus of the invention have application to a wide variety of problems that require the positioning of objects, particularly moving objects that are randomly oriented.

One application for which the method and apparatus of the invention are particularly suited is spacecraft docking. The invention may be used for spacecraft docking, solving a complex problem in an elegantly simple fashion.

The method and apparatus of the invention have application in landing helicopters, especially on moving platforms such as presented by ships. The method and apparatus of the invention have application to landing fixed wing aircraft especially on the decks of ships.

General materials handling applications which can benefit from the method and apparatus, of the invention include shipping, manufacturing, warehousing, and construction. The method and apparatus of the invention may be used for automatically aligning a forklift truck with randomly oriented cargo, or aligning building girders during skyscraper construction.

The method and apparatus of the invention can be used in aligning robotic end effectors to randomly oriented and/or moving workpieces.

The method and apparatus of the invention can be used for remotely measuring ocean waves and earth topology.

The method and apparatus of the invention can be used as an input device capturing the dimensions of three dimensional objects. The method and apparatus of the invention can scan and measure the dimensions of any three dimensional object. This information can be used to form computer models of physical objects.

In quality control applications, the method and apparatus of the invention can be used to detect and measure physical flaws.

The method and apparatus of the invention can be used to measure level of fluids in a container and disturbances of fluids.

In vehicular or airborne applications, the method and apparatus of the invention can be used to measure distance to another vehicle or aircraft, whether in front of, behind, beside, above or below the vehicle or aircraft from which the measurements are performed.

The method and apparatus of the invention can be used as an aid to the visually impaired by mapping the area in front of a travelling person and providing feedback to signal existence and location of obstacles. The method and apparatus can also be used to measure rise and fall of the ground in front of a blind person.

The method and apparatus of the invention can be used at night to provide terrain information to moving vehicles.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a schematic diagram illustrating an object and the X, y and z axes of a rectangular coordinate system with respect to which position and orientation of the object, and changes in position and orientation of the object, can be expressed mathematically;

FIG. 2 is a schematic diagram depicting an object moving linearly with respect to the x axis of the coordinate system illustrated in FIG. 1;

FIG. 3 is a schematic diagram depicting an object moving linearly with respect to the y axis of the coordinate system illustrated in FIG. 1;

FIG. 4 is a schematic diagram depicting an object moving linearly with respect to the z axis of the coordinate system illustrated in FIG. 1;

FIG. 5 is a schematic diagram depicting an object rotating with respect to the x axis of the coordinate system illustrated in FIG. 1;

FIG. 6 is a schematic diagram depicting an object rotating with respect to the y axis of the coordinate system illustrated in FIG. 1; and FIG. 7 is a schematic diagram depicting an object rotating with respect to the z axis of the coordinate system illustrated in FIG. 1.

FIGS. 9a through 9e are schematic diagrams illustrating how the image of an object within the field of view of a sensor, such as a camera, varies with distance from the sensor.

FIGS. 11a, 11b and 11c are schematic diagrams collectively illustrating how images of parallel lines within a fixed field of view vary when the lines are in different parallel planes, different distances from the viewing position.

FIGS. 12a, 12b and 12c are schematic diagrams collectively illustrating how images of perpendicular lines within a fixed field of view vary when the lines are in different parallel planes, at different distances from the viewing position.

FIG. 13a is a diagram illustrating perpendicular lines within a fixed field of view, in a plane parallel with a plane in which the viewing position and means for generating the perpendicular lines are located.

FIG. 13b is a diagram illustrating perpendicular lines wit in a fixed field of view, in a plane which has rotated about one axis with respect to a plane in which the viewing position d means for generating the perpendicular lines are located.

FIG. 13c is a schematic diagram illustrating the images, as sensed at the viewing position, of the perpendicular lines, in a plane parallel with the plane of the viewing position, illustrated in FIG. 13a.

FIG. 13d is a schematic diagram illustrating the images, as sensed at the viewing position, of the lines illustrated in FIG. 13b in a plane which has rotated with respect to the plane of the viewing position, showing that one line (53) moves in towards the center of the viewing area but remains parallel to the horizontal edge of the viewing area. The second line (51) pivots about its center so it is no longer parallel to the vertical edge of the viewing area.

FIG. 14a is a diagram illustrating images of a second pair of perpendicular lines in a fixed field of view in a plane parallel with the plane of the viewing position.

FIG. 14b is a diagram illustrating images of the second pair of perpendicular lines in a fixed field of view in a plane which has rotated about one axis with respect to the plane of viewing position.

FIG. 14c is a schematic diagram illustrating the images, as sensed at the viewing position, of the second pair of perpendicular lines located in a plane parallel with the plane of the viewing position as generally illustrated in FIG. 14a.

FIG. 14d is a schematic diagram illustrating images, as sensed at the viewing position, of the second pair of lines located in a plane which has rotated with respect to the plane of the viewing position as generally illustrated in FIG. 14b, showing that one line (51) moves in towards the center of the viewing area but remains parallel to the vertical edge of the viewing area. The second line (53) pivots out its center so it is no longer parallel to the horizontal edge of the viewing area.

FIGS. 15b and 15c are schematic diagrams illustrating images, as sensed at the remote viewing position, of the parallel lines, produced by the two laser scanners schematically depicted in FIG. 15a, created in the two parallel planes at different distances from the viewing position illustrated in FIG. 15a.

FIGS. 16b and 16c are schematic diagrams illustrating images, a sensed at the remote viewing position, of the perpendicular lines, produced by the two laser scanners schematically depicted in FIG. 16a, created in the two parallel planes at different distances from the viewing position illustrated in FIG. 16a.

FIG. 19b is another illustration, similar to FIG. 18b, of how the laser light lines of FIG. 19a would appear to a fixed field of view at a remote viewing position, and hence as the laser light lines would appear to a camera at such remote viewing position. Note that the lines are perpendicular and of the same length indicating that the viewing position is in a plane parallel to the container roof and that the lines do not fall off any edge of the container's of.

FIG. 27a is a diagram schematically illustrating laser line scan (36) in a plane parallel to the z axis, with the line being perpendicular with the x axis, setting forth geometric parameters respecting the laser scan line.

FIG. 27b is a diagram schematically illustrating the image of a laser scan line of FIG. 27a appearing at the fixed field position.

FIG. 33 is a block diagram of a subroutine portion of the computer program for which FIG. 32 is a block diagram, used in commanding a robot to position itself so that two laser scan lines are on an object, in accordance with certain aspects of the method of the invention for detecting orientation of an object.

FIG. 34 is a block diagram of a subroutine portion of the computer program for which FIG. 32 is a block diagram, using in commanding a robot to maneuver in the pitch direction in order to position itself so that a laser scan line on a remote object appears to be vertical at the fixed field of view on the robot, in accordance with certain aspects of the method of the invention for detecting orientation of an object.

FIG. 35 is a block diagram of a subroutine portion of the computer program for which FIG. 32 is a block diagram, used in commanding a robot to maneuver in the roll direction in order to position itself so that a laser scan line on a remote object appears to be horizontal at the fixed field of view on the robot, in accordance with certain aspects of the method of the invention for detecting orientation of an object.

FIG. 36 is a block diagram of a subroutine portion of the computer program for which FIG. 32 is a block diagram, used in commanding a robot to perform an x alignment.

FIG. 37 is a block diagram of a subroutine portion of the computer program for which FIG. 32 is a block diagram, used commanding a robot to perform a y alignment.

FIG. 38 is a block diagram of a subroutine portion of the computer program for which FIG. 32 is a block diagram, used in commanding a robot to perform a yaw alignment by maneuvering clockwise or counterclockwise about the z axis until the image at the fixed field of view on the robot of laser light line denoting pitch is vertical.

FIG. 39 is a block diagram of a subroutine portion of the computer program for which FIG. 32 is a block diagram, used in commanding a robot to perform a yaw alignment by maneuvering clockwise or counterclockwise about the z axis until the roll line is horizontal.

FIG. 40 is the block diagram of a subroutine portion of the computer program for which FIG. 32 is a block diagram, used in commanding a robot to perform a Z alignment.

DETAILED DESCRIPTION OF PREFERRED EMBODIMENT

Figure 1:
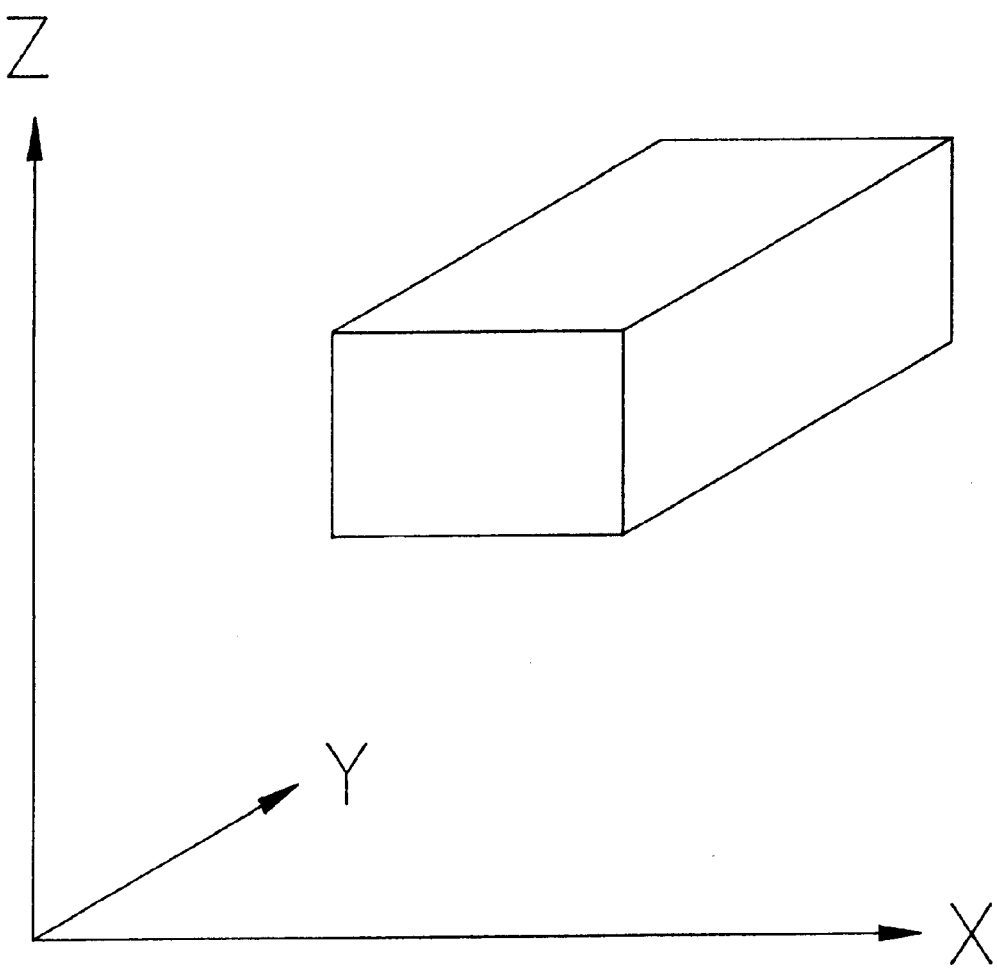
FIGS. 1 through 7 illustrate the coordinate system scheme used by the method and apparatus of the invention and provide a frame of reference with respect to navigational problems of the prior art, which are addressed by the present invention. More specifically.

Certain terminology is used herein for convenience only and is not be taken as a limitation on the present invention. In the drawings, the same reference numerals are employed for designating the same elements throughout the several figures.

Definitions

Figure 5:
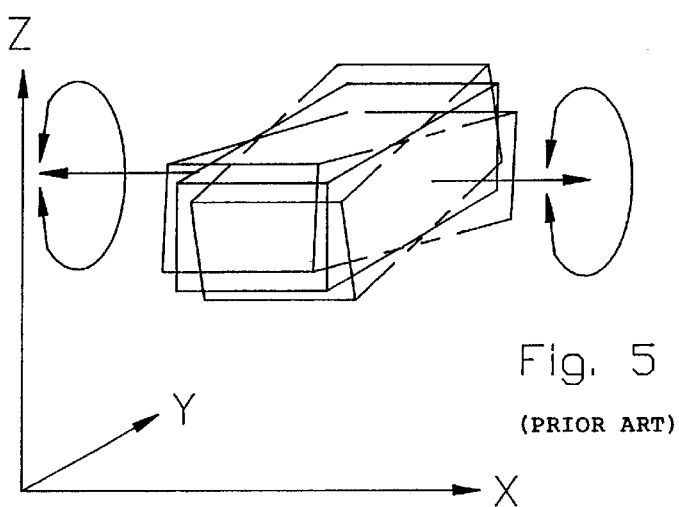

The following definitions are provided to promote understanding of the method and apparatus of the invention and to provide a frame of reference with respect to navigational problems of the prior art as addressed by certain of the method and apparatus aspects of this invention:

"Pitch" denotes rotational movement of an object with respect to the x-axis of a rectangular coordinate system as illustrated in FIG. 5.

Figure 6:
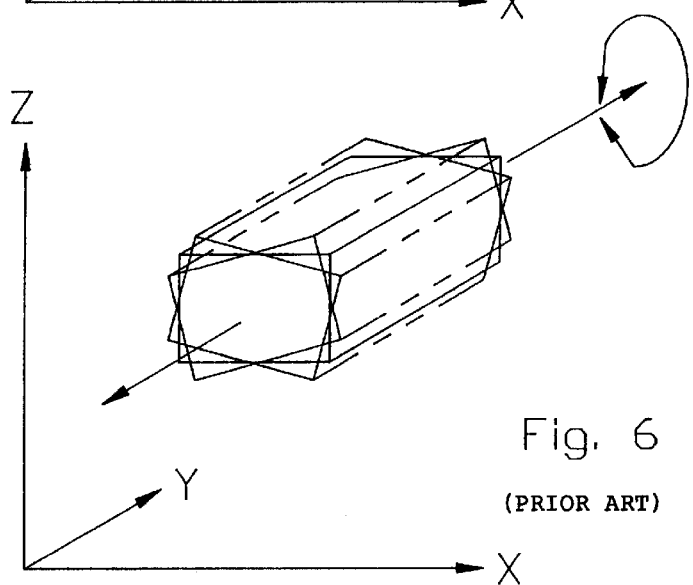

"Roll" denotes rotational movement of an object with respect to the y-axis of a rectangular coordinate system as illustrated in FIG. 6.

Figure 7:
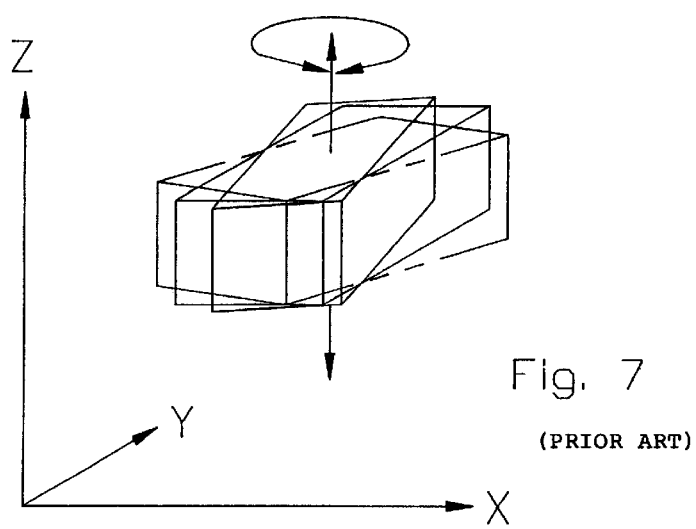

"Yaw" denotes rotational movement of an object with respect to the z-axis of a rectangular coordinate system as illustrated in FIG. 7.

Figure 2:
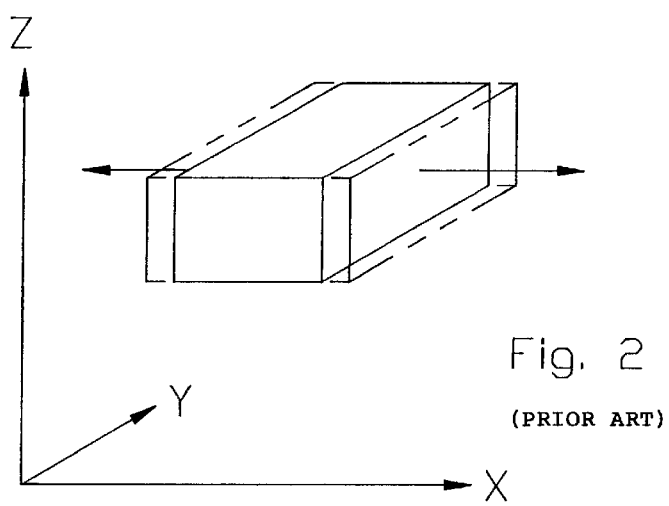

"Sway" denotes linear movement of an object with respect to the x-axis of a rectangular coordinate system as illustrated in FIG. 2.

Figure 3:
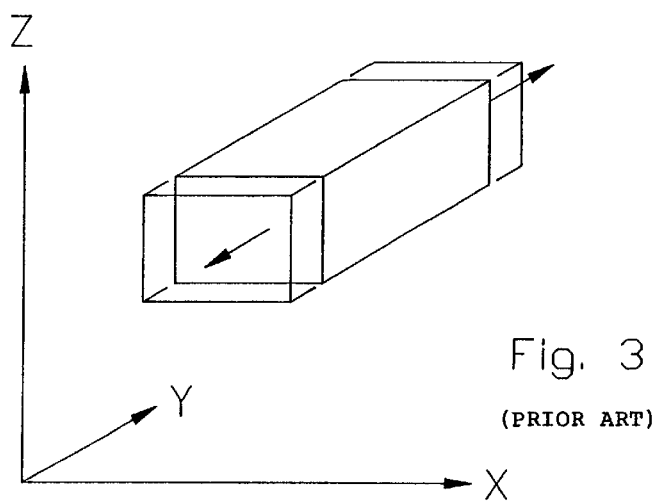

"Surge" denotes linear movement of an object with respect to the y-axis of a rectangular coordinate system as illustrated in FIG. 3.

Figure 4:
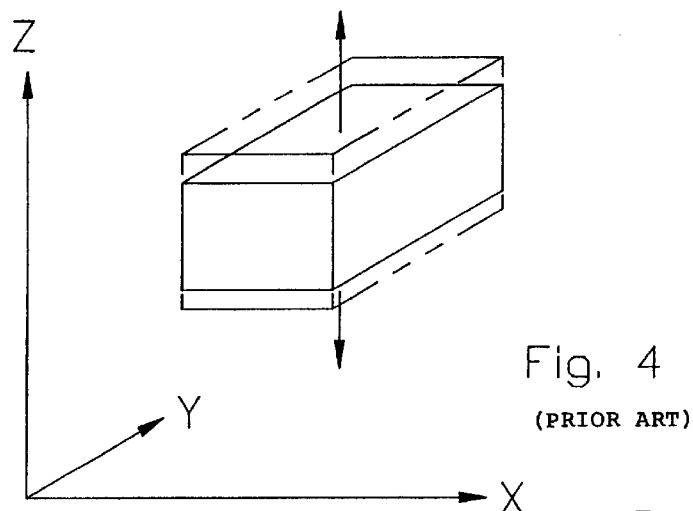

"Heave" denotes linear movement of an object with respect to the z-axis of a rectangular coordinate system as illustrated in FIG. 4.

"Dither" denotes small amplitude oscillatory movement.

"Heuristic" denotes an iterative process seeking a solution to a mathematical problem not susceptible to solution via a single calculation.

Optical Principles Underlying the Invention

FIG. 9a illustrates a principle used in the apparatus and method aspects of the invention. In FIG. 9a the field of view of a television camera, which is designated generally 2, is designated generally 11. A rectangular object, FIG. 9b, which for purposes of illustration may be considered to be a piece of paper, having an "X" designated 13 marked thereon, is designated generally 10. Four parallel, position-defining planes, all of which are parallel to the plane of the paper and represent positions the paper will be placed in the examples, are designated generally 17, 18, 20 and 22.

Paper 10 may be positioned in the field of view 11, in front of focus point 38 of camera 2 in any one of planes 17, 18, 20 and 22. Plane 18 has been selected as one where edges of object 10 are coincident with the field of view of camera 2. If object 10 is in plane 18, the image of object 10 just fills the field of view designated generally 11 of camera 2, which in turn completely fills the screen of the monitor designated generally 4 in FIG. 8 with the image of object 10. While object 10 remains in position in plane 18, with edges of object 10 coincident with the boundaries of the field of view of camera 2, the image displayed on the screen of monitor 4 in FIG. 8 is shown on monitor screen 18' in FIG. 9c.

Figure 8:
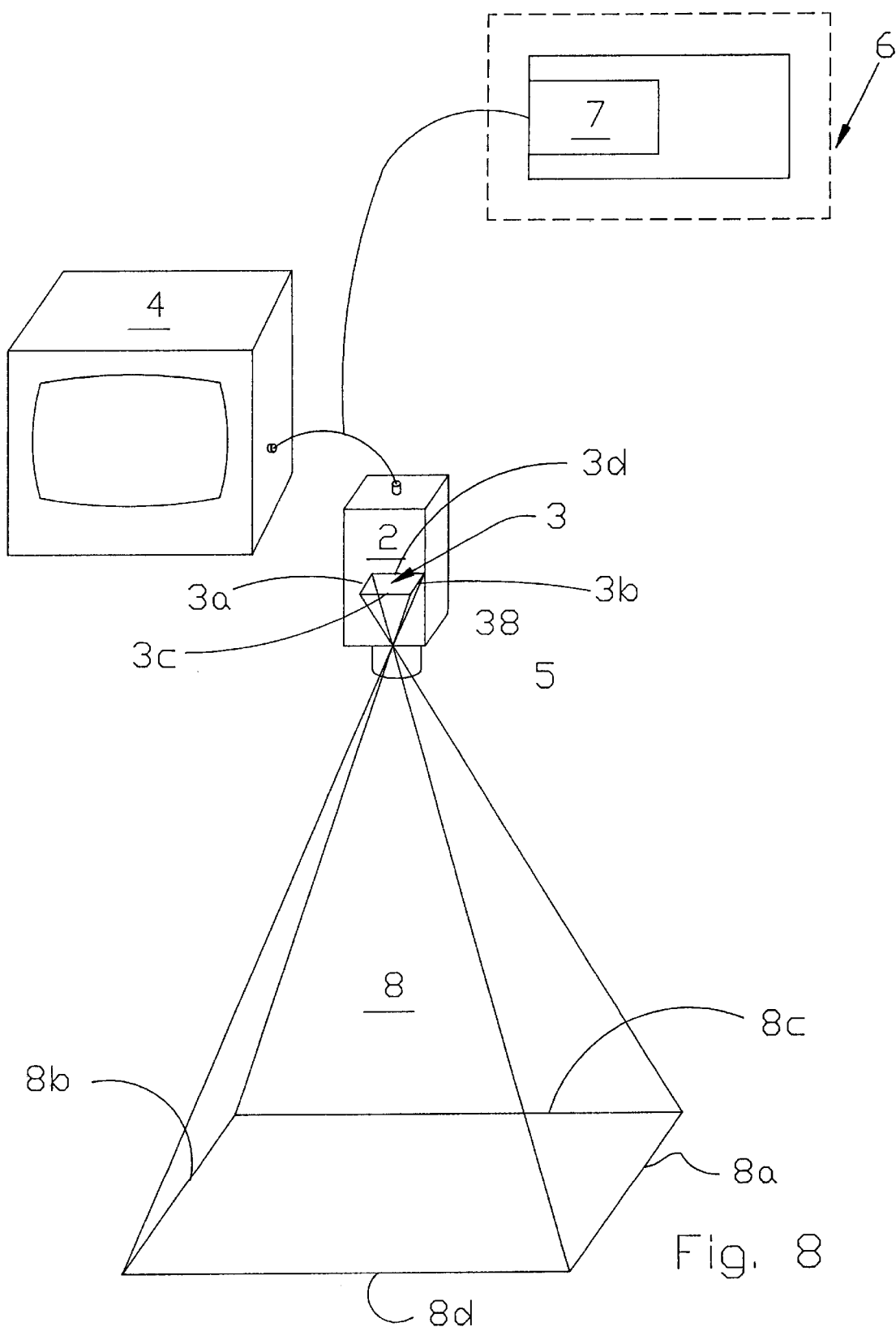
FIG. 8 is a schematic illustration of apparatus for remotely sensing position and orientation of objects in accordance the invention.

As object 10 is moved farther away from lens 5 of camera 2 to planes 20 and 22, the image of object 10 as seen on monitor 4 in FIG. 8 occupies less of field of view 8 and appears to shrink in size. While object 10 is positioned in planes 20 and 22, the images displayed on the screen of monitor 4 in FIG. 8 are shown on monitor screens 20' and 22', respectively in FIGS. 9d and 9e.

Since the computer designated 6 in FIG. 8 sees whatever the television camera 2 in FIG. 8 sees and monitor 4 in FIG. 8 displays, computer 6 recognizes and uses the images appearing on monitor screens as illustrated in FIGS. 9c, 9d and 9e.

Creating Light Lines on Remote Objects

Figure 10A:
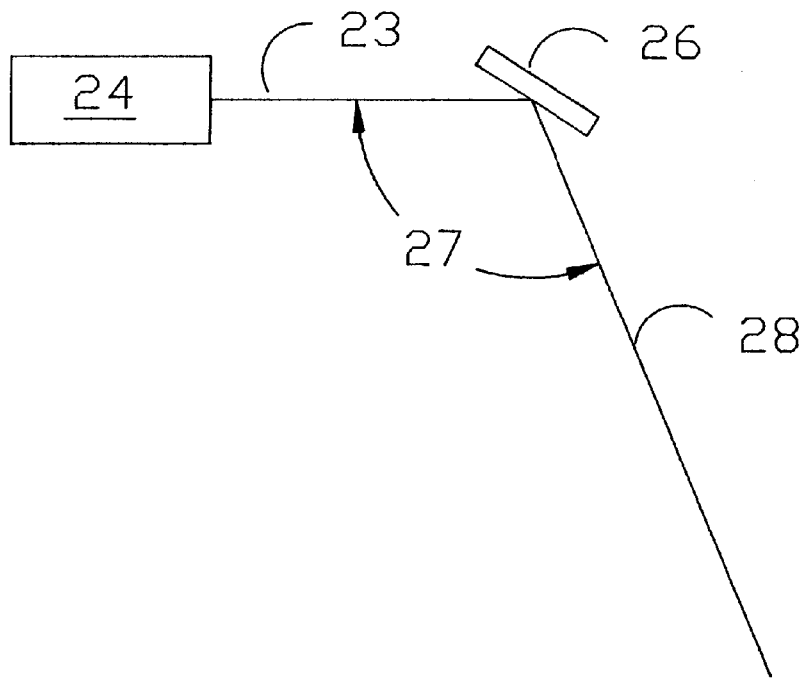
FIGS. 10a, 10b and 10c are schematic diagrams collectively illustrating light projection on a remote object to create a light line thereon.
Figure 10B:
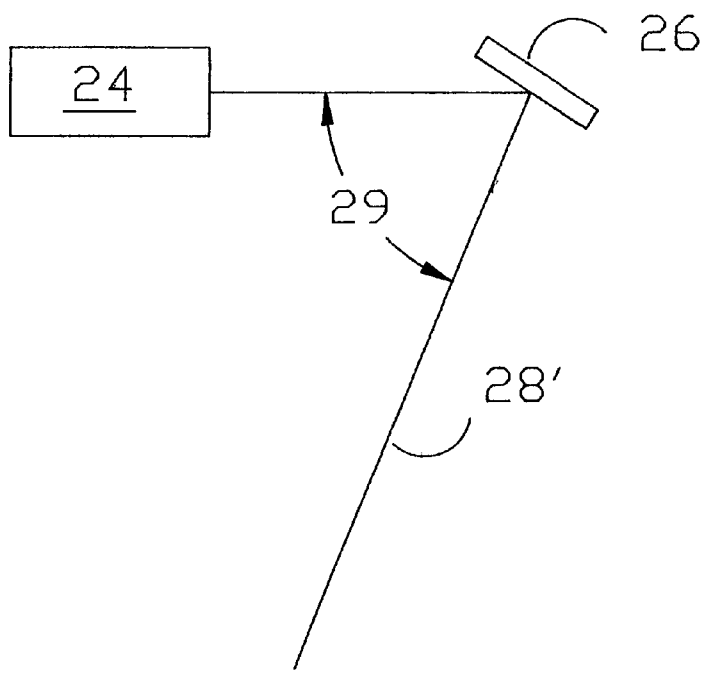
Figure 10C:
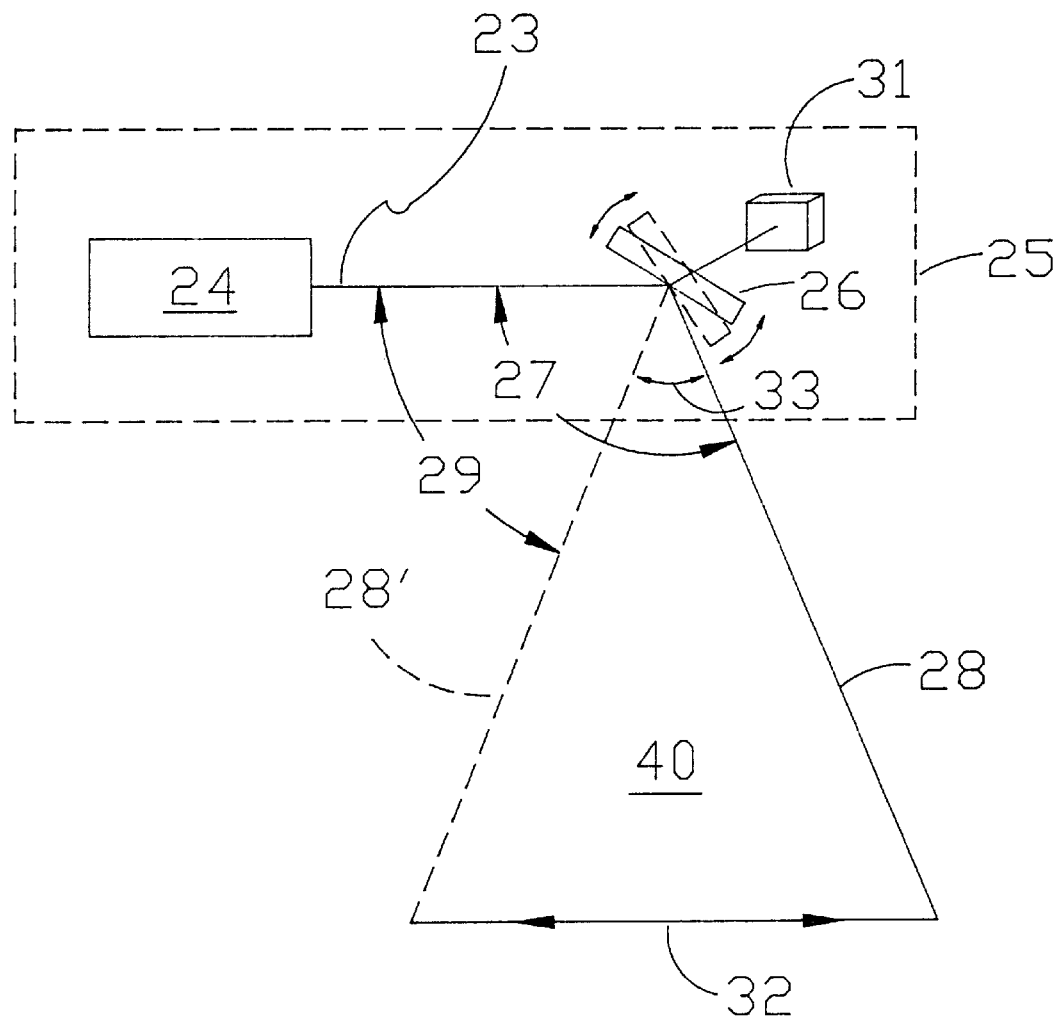

FIGS. 10a, 10b and 10c illustrate a laser light line generator designated generally 25 for projecting or "painting" a laser light line stripe designated generally 32 on a remote object. Laser light line generator 25 includes a laser beam generator designated generally 24, an oscillating mirror designated generally 26 and a galvanometer designated generally 31.

FIG. 10a shows a laser beam hitting mirror 26 which is positioned at an angle designated generally 27, diverting the laser beam to a path designated generally 28. Similarly, FIG. 10b shows how the laser beam is directed along a path designated generally 28' by positioning mirror 26 at an angle designated generally 29. FIG. 10c shows mirror 26 moving from position 27 to position 29. Galvanometer 31 in FIG. 10c, driven by a sine wave, moves mirror 26 between angular positions 27 and 29.

As the mirror 26 moves from angular position 27 to angular position 29 the laser beam sweeps through the area between paths 28 and 28', creating an envelope of laser light referred to as the laser scan field and which is designated generally 40 in FIG. 10c. The angle between paths 28 and 30, referred to and the laser scan angle, is designated generally 33 in FIG. 10c.

If laser light beam sweeping back and forth, between paths 28 and 28', encounters an object, a laser scan line 32 is drawn on the object as shown in FIG. 10c. If angles 27 and 29 are known, distance from mirror 26 to the object can be determined if the length of the laser scan line 32 can be measured. Laser lines can also be created using lasers with line projection lenses.

Positional Recognition Logic and Measurement Principles of the Invention

Distance Measurements

The concepts illustrated in FIGS. 9a through 9e and 10a through 10c define the basic geometry of the position and orientation sensing method and apparatus of the invention. This geometry is illustrated schematically in FIGS. 11a through 16c.

In the course of explaining the principles underlying the method and apparatus of the invention, reference is made to television camera 2 as viewing, to monitor 4 as displaying and to computer 6 as processing information and computing information from which the position and orientation of a remote object can be determined. Reference to the television camera, monitor and computer are for purposes of illustration only; the invention is not limited to such apparatus.

At the top of FIG. 11a is a plane designated generally 34 in which two laser light line generators 25 are schematically illustrated. Additionally the focus point designated generally 38 (which may be considered to be associated with a sensor such as camera 2 illustrated in FIG. 9) is positioned in plane 34. Laser light line generators 25 are positioned so that, (referring to FIGS. 10a, 10b and 10c) the points at which laser beams 23 hit respective mirrors 26 are in plane 34; these points (at which laser beams hit the mirrors) may be considered to define laser scanners or laser scan sources.

FIG. 11a illustrates the field of view 8 defined by the angular breadth of light gathered and focused at focus point 38 (of camera 2 or some other sensor) as well as the laser scan fields 40 produced by the laser light line generators 25. Planes 42 and 44 in FIG. 11a are parallel with plane 34.

If an object is placed in plane 42 in FIG. 11a and has a planar surface which is in plane 42, two laser light lines will appear on the object as the laser light line generators 25 produce laser scan fields 40. If the object is of such size that the edges of the object are coincident with the edges of the field of view 8 when the object is in plane 42, or if the distance of plane 42 from focus point 38 is adjusted until the edges of the object are coincident with the edges of the field of view 8, the image of the object and the laser light lines thereon will be as shown in FIG. 11b—the edges of the object will not be seen since those edges are coincident with the edges of field of view 8 of the camera or other sensor. If the object is of such size that the edges of the object are inboard of the edges of field of view 8, as illustrated by plane 44 where the edges of the object are denoted 47, or if the distance of the plane in which the object is positioned is adjusted until the edges of the object are inboard of the edges of field of view 8, then the image of the object and the laser light lines thereon is as shown in FIG. 11c: The edges of the object are visible since those edges are inboard of the edges of the field of view 8 of the camera or other sensor.

The length of the laser light lines is the same as seen by the camera or other sensor, no matter where the object is positioned, so long as the object surface has sufficient room to receive the entire laser light line and the surface of the object is parallel with plane 34 in which the focus point resides. This is illustrated in FIGS. 11b and 11c: Even though the actual length of the laser light lines on the object varies, depending on the distance of the object from the laser light line generators 25, because the length of the light lines is proportional to the distance of the object from the laser light line generators, the apparent length of the laser light lines, as sensed by the camera or other sensor at focus point 38 does not change.

When the object is in plane 44 in FIG 11a, the images of the two laser light lines 32' appear to the camera or other sensor (having focus point 38) to be parallel with each other and with the edges of the field of view 8 (and hence parallel with the vertically extending edges of the screen of the display or monitor associated with camera 2 or other sensor). If the object is moved from plane 44 to plane 42, the images of the two parallel laser light lines appear to move away from one another, towards the edges of the display or monitor associated with camera 2 or other sensor, as illustrated by a comparison of FIGS. 11b and 11c, but the images do not appear to change in length. As the images of the two lines move, the lines remain equidistant from the edges of the display or monitor associated with camera 2 or other sensor.

An object is placed in planes designated generally 42 and 44 in FIG. 11a in the field of view 8. The boxes in FIGS. 11b and 11c are monitor screens which illustrate what would be seen on the screen of monitor 4 in FIG. 8 in the field of view 8 in FIG. 11a by camera 2 in FIG. 8, if laser scan lines 32 were projected onto an object placed in planes 42 and 44 in FIG. 11a, respectively.

Planes 42 and 44 in FIG. 11a are assumed to be in parallel with plane 34 in FIG. D which holds the focus point 38 in FIG. 11*a* and the laser scan sources 36 in FIG. 11*a*. If an object is placed in plane 42 in FIG. 11*a*, the monitor screen in FIG. 11*b* displays two vertical lines parallel to each other and to the vertical edges of the monitor screen. The distance of both lines from the vertical edge of the monitor screen in FIG. 11*b* would be the same. With the geometrical configuration shown, the laser scan lines as seen on the monitor screen in FIG. 11*b* are equal in length.

If the object moves from plane 42 to plane 44 in FIG. 11*a*, the parallel lines appear to move horizontally towards the center of the monitor screen in FIG. 11*c*. The lines are equidistant from the sides of the monitor screen. The length of the lines are unchanged. The lines did not move vertically as demonstrated by monitor screens in FIGS 11*b* and 11*c*.

The distance from the lines to the edge of a monitor screen is proportional to the distance of the object from the focus point 38 in FIG. 11*a*. As the object moves away from the focus point 38 in FIG. 11*a* of television camera 2 in FIG. 8, the camera 2 in FIG. 8 can see more and more of the object as illustrated by monitor screens in FIGS. 11*b* and 11*c*. The same phenomenon is true of the laser scan sources—the further away the laser scan source 36 move from the object, the more the object can fit within the laser scan fields 40 and the longer the laser scan lines 32 become as shown in planes 42 and 44 of FIG. 11*a*.

While the laser scan sources 36 and the focus point 38 are moving together away from an object or towards an object, the laser scan line produced by the laser scanners 25 occupies the same percentage of the field of view 8. Therefore, the length of the laser scan lines 32 that are recorded or visible to camera 2 in FIG. 8 or some other sensor do not change.

Although edges designated generally 47 of an object in planes 44 are shown in monitor screen 3 in FIG. 11*c*, the monitor 4 in FIG. 8 and computer 6 in FIG. 8 do not actually display or recognize the edges 47 of the object in plane 44 in FIG. 11. A filter can be used in front of the camera 2 in FIG. 8 so that the camera 2 in FIG. 8 views only the laser scan lines 32 in FIG. 11*a*.

Figure 12A:
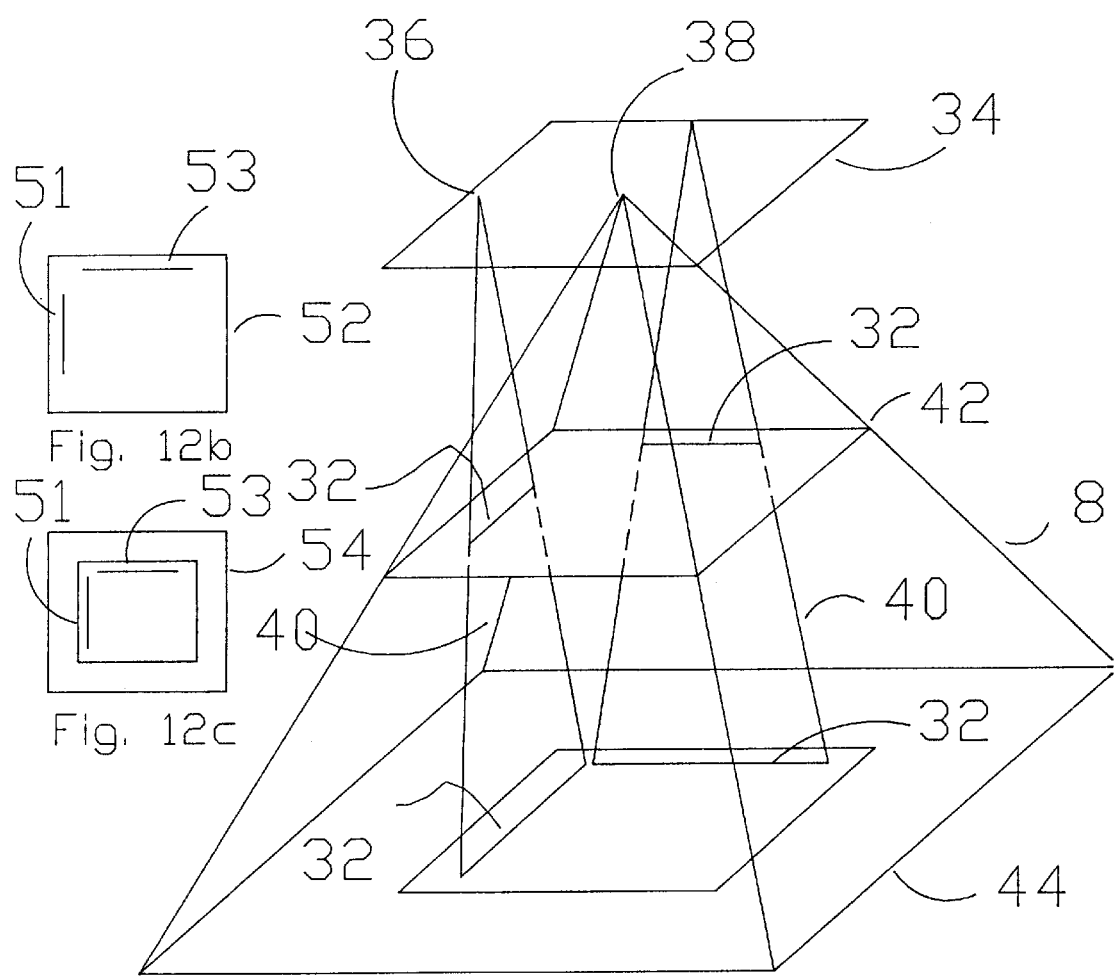

FIG. 12*a* shows a slightly different configuration from that of FIG. 11*a*. In this configuration, the laser scanners 36 in FIG. 12*a* generate lines that are perpendicular to one another, however, the method to measure the distance of objects is similar to the method which was explained in conjunction with FIG. 11*a*. The monitor 4 displays vertical and horizontal representations of the laser scan lines 32. These representations are designated generally 51 and 53 respectively in FIGS. 12*a* through 12*c*.

Referring to the monitor screen designated generally 52 and 54 in FIG. 12*b* and 12*c* respectively, the geometry of the method and apparatus of the invention is such that when the object is in plane 42 in FIG. 12*a*, monitor screen 52 in FIG. 12*b* displays two lines representing two laser scan lines 32. The representations 51 and 53 of laser scan line 32 in plane 42 in FIG. 12*a* are shown on monitor screen 52 in FIG. 12*b*. Results of placing the object in plane 44 are shown in FIG. 12*c*, on monitor screen 54. Representations 51 and 53 in FIGS. 12*b* and 12*c* are parallel to their respective edges, and are perpendicular to each other. The monitor screen 52 shows the vertical laser scan line representation 51 in FIGS. 12*b* and 12*c* parallel with vertical edge of monitor screen 52. The monitor screen 52 shows the horizontal laser scan line representation 53 in FIGS. 12*b* and 12*c* in parallel with the horizontal edge of monitor screen 52.

When the object moves to plane 44 in FIG. 12*a*, the monitor screen designated generally 54 displays representations 51 and 53 in FIG. 12*c* moving an equal distance towards the center of the monitor screen 54. The representations 51 and 53 in FIG. 12*c* of laser scan lines 32 do not change size, and they do remain parallel with the edges of the monitor screen 54. Vertical laser scan line representation 51 in FIG. 12*c* does not move in the vertical direction. Horizontal laser scan line representation 53 does not move in the horizontal direction when the object is moved from plane 42 to 44. The distance of the representations 51 and 53 in FIG. 12*c* of laser scan lines 32 from the edge of the monitor screen 54 are proportional to the distance of the object in plane 44 from the focus point 38 in FIG. 12*a*.

Sensing Object Orientation with Respect to an Axis

FIGS. 13*a* through 13*d* illustrate sensing pitch. FIGS. 13*a* and 13*b* show an object in a plane designated generally 50 in two different positions. In FIG. 13*a*, the object in plane 50 is parallel with the plane 34 that holds the focus point 38 and the laser scan sources 36. Object in plane 50 is kept at a constant distance from the focus point 38, but in FIG. 13*b* the object in plane 50 is rotated into a new plane 60 that is pitched with respect to the plane 34 that holds the focus point 38 and laser scan sources 36 in FIG. 13*b*.

As shown on the monitor screens designated generally 56 and 58, in FIGS. 13*c* and 13*d*, horizontal laser scan line representation 53 moves away from the top of the monitor screen. However, vertical laser scan line representation 51 in FIGS. 13*a* and 13*b* did not move appreciably away from the vertical edge. Horizontal laser scan line representation 53 in FIGS. 13*c* and 13*d* did not change in size, nor did it shift in the horizontal direction.

Vertical laser scan line representation 51 in monitor screen 58 in FIG. 13*b* is tilted slightly out of parallel with the vertical edge of the monitor screen 58. In fact, the bottom half of the vertical laser scan line representation 51 in FIG. 13*b* does not appear on the monitor screen 58. This indicates that the laser scan line 32 normally positioned vertically must have gone beyond the field of view 8.

Therefore, vertical laser scan line representation 51 in FIG. 13*d* is used to indicate pitch. The distance the horizontal laser scan line representation 53 in FIGS. 13*c* and 13*d* moved with respect to the center of the vertical laser scan line representation 51 in FIGS. 13*c* and 13*d* is proportional to the pitch designated generally 61 in FIG. 13*b*.

FIGS. 14*a* through 14*d* illustrate sensing roll, in a manner similar to FIGS. 13*a* through 13*d*. FIGS. 14*a* and 14*b* shown an object in plane 50 in two different positions. In FIG. 14*a*, the object in plane 50 is parallel with the plane 34 that holds the focus point 38 and the laser scan sources 36. The object in plane 50 is kept at a constant distance from the focus point 38, but in FIG. 14*b*, the object in plane 50 is rotated into a new plane 62 that is rolled with respect to the plane 34 in FIG. 14*b*. As shown on the monitor screens designated generally 64 and 66, in FIGS. 14*c* and 14*d*, the vertical laser scan line representation 51 moves away from the vertical edge of the monitor screen as shown on monitor screens 64 and 66. However, the horizontal laser scan line representation 53 in FIGS. 14*a* and 14*b* did not move appreciably. The horizontal laser scan line representation 53 in FIGS. 14*c* and 14*d* did not change in size, nor shift in the horizontal direction.

The horizontal laser scan line representation 53 in FIG. 14*d* is tilted slightly out of parallel with the horizontal edge of the monitor screen 66. This position indicates roll. The distance the vertical laser scan line representation 51 in FIGS. 14*c* and 14*d* moved with respect to the center of the horizontal laser scan line representation 53 in FIGS. 14c and 14d is proportional to the roll angle designated 63.

Applying the Optical and Measurement Principles and Positional Logic to Navigational and Positional Problems FIGS. 12a through 14d illustrate how heave, roll and pitch can be sensed individually. Complex combinations can also be sensed.

In one practice of the method of the invention, apparatus according to the invention is mounted on a robot and used to sense position and orientation of a remote object so as to position the robot to be able to pick up the remote object.

The task was to move, using a robotic method and apparatus of the invention and computer 6, a robotic end effector also called a spreader bar so that it was parallel to the plane of the object. This object could be a container. Computer 6 commands the robotic end effector to move in directions based on the information it receives from the camera and computations the computer performs. The laser scanner 25 in FIGS. 10a through 10c and 17 and the camera 2 in FIG. 8 were mounted on the robot so that the focus point 38 and laser scan sources 36 in FIGS. 12a through 14d were in the same plane 34.

Computer 6 maneuvers the robotic end effector to place plane 34 containing the focus point 38 and laser scan sources 36 in parallel with the object. Plane 34 in FIGS. 11a through 14d is parallel to the plane containing the object, whenever the distance between the laser scan line representations and the edges of a monitor screen are equal. Once the planes are parallel, computer 6 maneuvers the robot to eliminate the heave distance by moving the camera 2 mounted on the robot to minimize the distance of the lines to the edge of the screen. In this way, computer 6 positions the robot in parallel and in close proximity to the object.

By changing the position of the laser scanner 25 in FIG. 11a through 14d and 17 or camera 2 in FIG. 8 in relationship to each other, this invention capability increases.

While laser scan sources 36 should desirably be in the same plane as focus point 38, the further away the laser scanners are from focus point 38 of camera 2, the more sensitive the method and apparatus of the invention. In addition, angling the laser scanners as shown in FIGS. 15a and 16a increases sensitivity.

Depending on the deviation of the laser scanner beam from the vertical designated generally by angle 68, small motions produce large effects as shown on monitor screens depicted in FIGS. 15b, 15c, 16b and 16c.

Figure 15A:
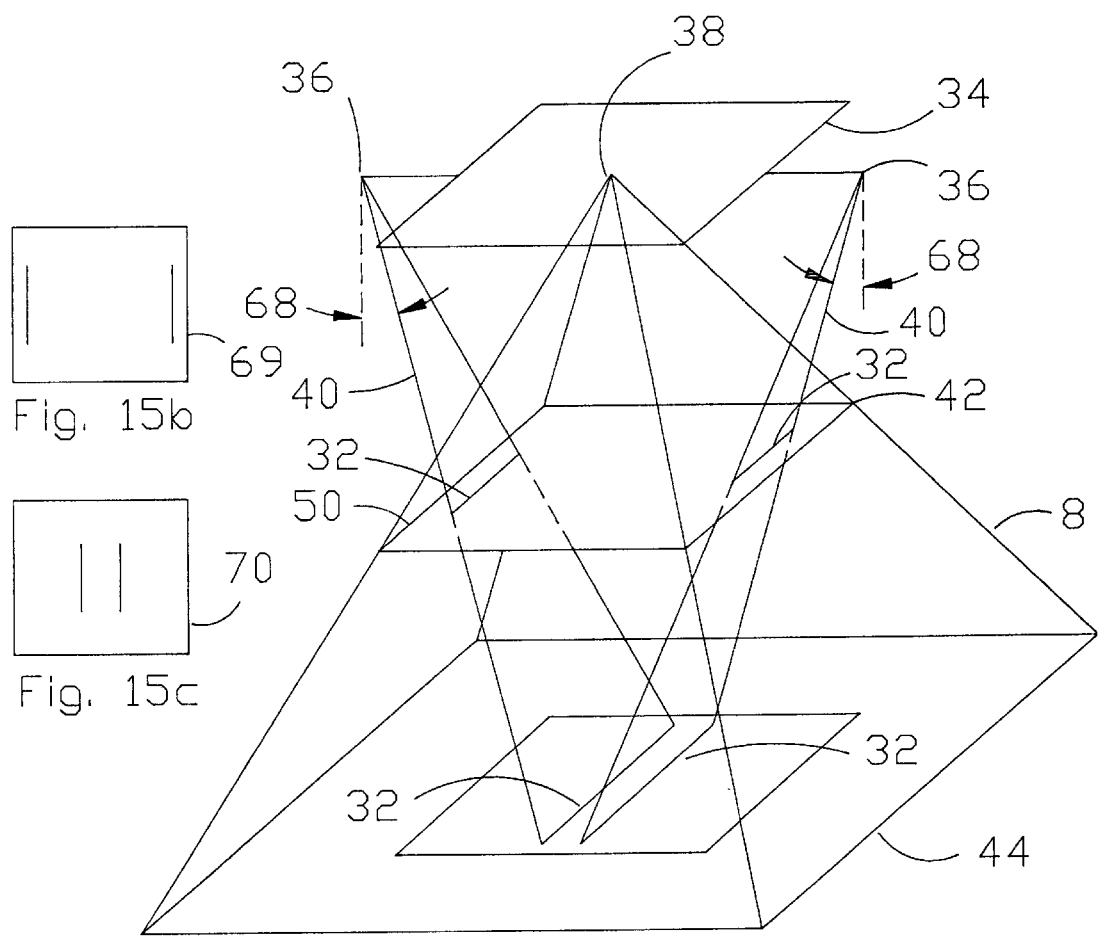
FIG. 15a is a diagram illustrating use of two laser scanners to produce parallel lines within a fixed field of view in parallel planes at different distances from a plane in which the laser scanners and the viewing position are located.
Figure 16A:
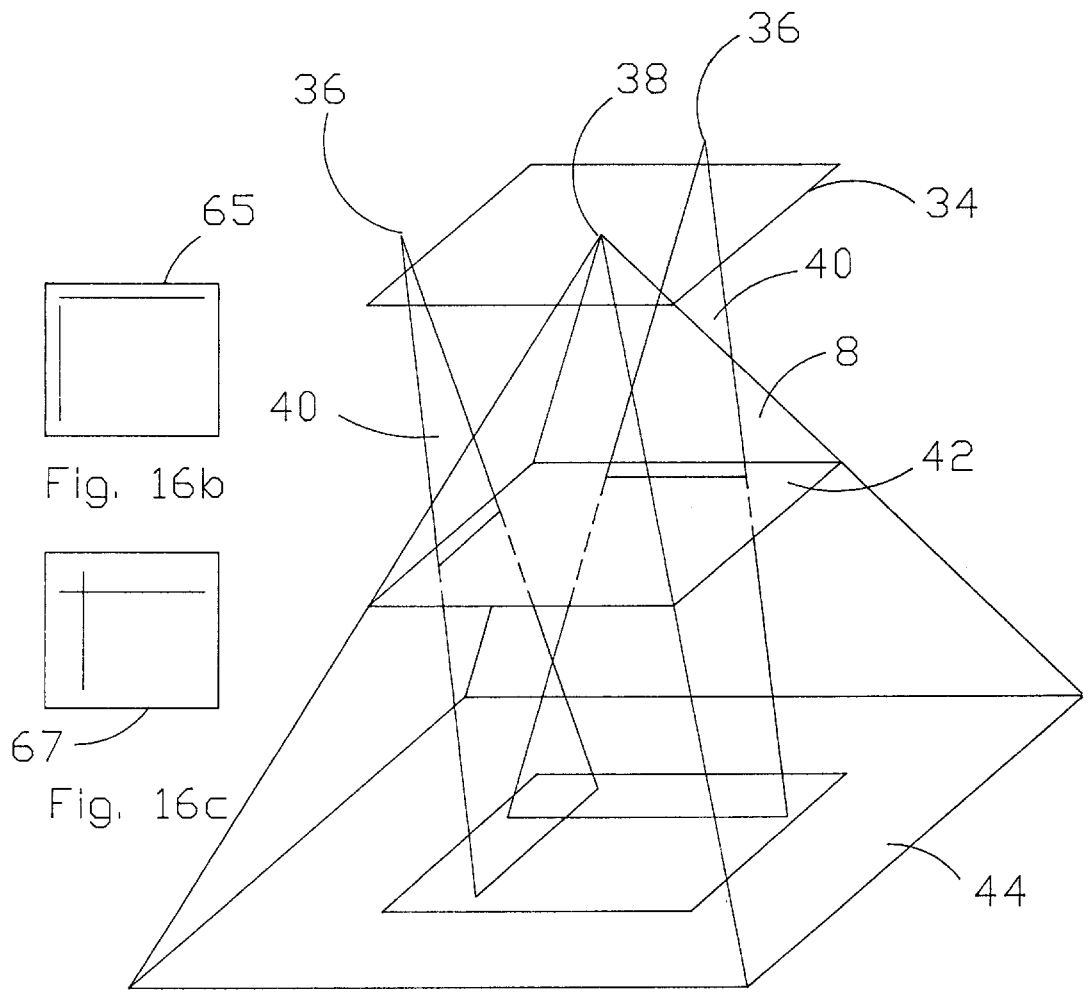
FIG. 16a is a diagram illustrating use of two laser scanners to produce perpendicular lines within a fixed field of view in parallel planes at different distances from a plane in which the laser scanners and the viewing position are located.

Field of view 8 in FIGS. 8 and 9a and the laser scanner beam angle from the vertical designated generally 68 in FIGS. 15a are independent.

The method and apparatus of the invention encompass the laser scan sources 36 and focus point 38 being in different planes, but the calculations are more complex.

FIGS. 17 through 21b illustrate how a computer 6 utilizes laser scan lines 32 to detect yaw, surge and sway, to provide sensory feedback to guide a robot into a position in which it can pick up an object such as a container designated generally 72 in FIG. 9. The container can be stationary or can be moving in any of the degrees of freedom—roll, pitch, yaw, heave, sway and/or surge. In such practice of the invention, laser scanners 25 as illustrated in FIGS. 10a through 10c and a camera 2 as illustrated in FIG. 8 are mounted to the robot 70 shown in FIG. 17.

Initially, encoders, machine vision, conventional microwave, ultrasonics or other means are used to place the robot in a position somewhere over container 72. Although the order of operation is of no particular importance, in the practice of the method and apparatus of the invention shown in FIGS. 17 through 21b the method first lines up the robot 70 in roll, pitch and heave with respect to container 72 and then resolves any error in surge, sway and yaw.

FIGS. 17 through 21b demonstrate how the method and apparatus of the invention are used to heuristically position robot 70 with respect to container 72. FIGS. 17, 18a, 19a, 20a and 21a show container 72; FIGS. 18b, 19b, 20b and 21b show a corresponding sensor field of view or a monitor screen.

Laser scan lines are shown as appearing on the top of container 72 in FIGS. 17, 18a, 19a, 20a and 21a; the images of the laser scan lines are shown in corresponding FIGS. 18b, 19b, 20b and 21b as those images would appear to a sensor associated with computer 6 in FIG. 8 or to a person viewing monitor 4 in FIG. 8. For the laser scan line configurations and line images in each of the FIGS., the robot has already first been positioned in the neighborhood of container 72 using encoders, machine vision, microwave, ultrasonics or some other means, and then has been further positioned in a plane parallel to the top surface of container 72 by sensing roll, pitch and heave as previously described and moving the robot in response thereto.

If a laser scan line does not strike the top of container 72, no image of the laser scan line appears to the sensor or on the monitor screen. The specific geometry of the invention creates this attribute which in turn reduces the computational burden. The geometry is such that laser scan lines are out of the field of view 8 of the sensor, which may be camera 2 in FIG. 8, if the laser scan lines are not on container 72. In some applications the scan lines would remain in the field of view, but the scan line positions would be so far from the expected location that the computer would realize that the target is grossly misaligned and would use the more conventional means to perform gross alignment.

Where the laser scan line remains visible to the sensor if the laser scan line has missed container 72 or is only partially on container 72, a computer such as computer 6 in FIG. 8 can still process the information. Lines that fall off container 72 do not disappear but dramatically jump in position as sensed by the sensor and as appearing on the monitor screen, signalling that the line has fallen off container 72. Lines that are partially on container 72 will be Visible to the sensor and hence to a computer such as computer 6 in FIG. 81, but will be predictably discontinuous.

Figure 18A:
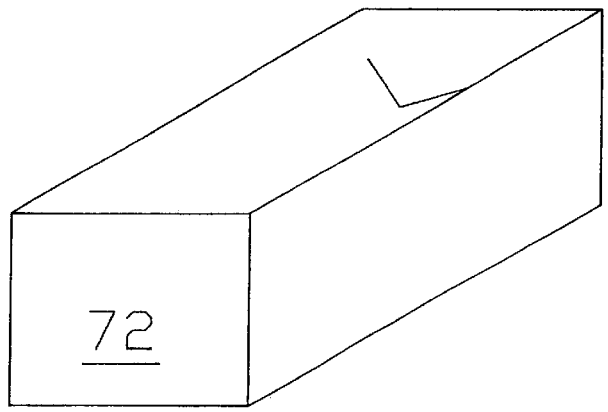
FIG. 18a is an illustration of laser light lines as appearing on the top of a container.
Figure 18B:
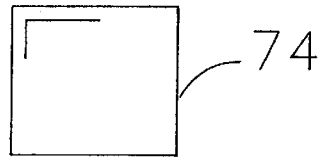
FIG. 18b is an illustration of how the laser light lines of FIG. 18a would appear to a fixed field of view at a remote viewing position, and hence as the laser light lines would appear to a camera at such remote viewing position. Note that the vertical line is shorter than the horizontal line (although perpendicular to it), indicating that the vertical line fall on an edge of the container's roof, and the viewing position is in a plane parallel to the roof.

FIG. 18a shows a possible initial placement of the laser scan lines on container 72. As received by the sensor and as seen on monitor screen 74 depicted in FIG. 18b, the horizontal line is of the expected length, but the vertical line is shorter than expected. From this information, a computer such as computer 6 in FIG. 8 can make one of the following three conclusions: (1) Since both of the lines are not fully on the screen, the robot is positioned near an edge of container 72. (2) Since the vertical line is only partially visible, the robot is near the lengthwise edge of container 72. (3) A yaw correction is required since the bottom portion of the vertical line is missing—the robot must rotate counterclockwise to make the correction.

In the example, the computer makes the yaw correction by commanding the robot to rotate counterclockwise until the full length of the vertical line appears on the monitor screen. The computer also commands the robot to dither in the sway direction. The result of these two steps is illustrated in FIG.

19a. The computer recognizes when the robot has attained the position shown in FIG. 19a as a result of dithering the robot in the sway direction. If, in response to the dithering, the vertical laser scan line on the monitor screen is either the full, expected length or completely missing, the computer knows that the robot is aligned with the lengthwise edge of container 72 and also aligned correctly in yaw. This condition is shown on monitor screen 75 in FIG. 19b.

Hence, if a laser scan line on the monitor is shorter than expected, a yaw correction may be required.

Figure 20A:
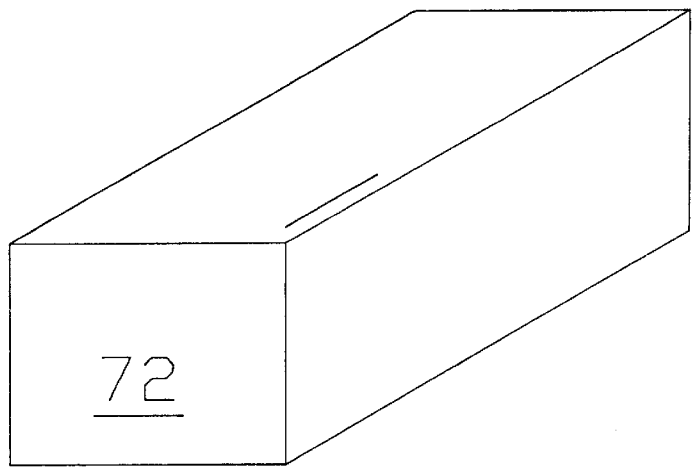
FIG. 20a is yet another illustration of a laser light line as appearing on the top of a container.
Figure 20B:
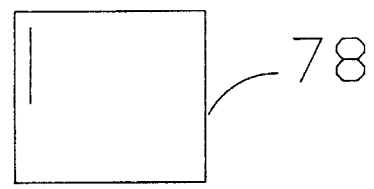
FIG. 20b is an illustration of how the laser light line of FIG. 20a would appear to a fixed field of view at a remote viewing position, and hence as the laser light lines would appear to a camera at such remote viewing position. This indicates that the viewing position is in a plane parallel to the roof of the container and that the missing line has fallen off the edge of the container.

Knowing that the robot is aligned in yaw on the lengthwise edge of container 72, the computer then seeks the end or widthwise edge of container 72. The computer searches for the end edge of container 72 by commanding the robot to move in the surge direction until the horizontal line on the monitor disappears. This indicates that the laser scan line fell off the end edge of container 72, as shown in FIG. 20a. The length of the vertical line indicates how far beyond the edge the robot travelled. This condition is illustrated on monitor screen 78 in FIG. 20b.

Figure 21A:
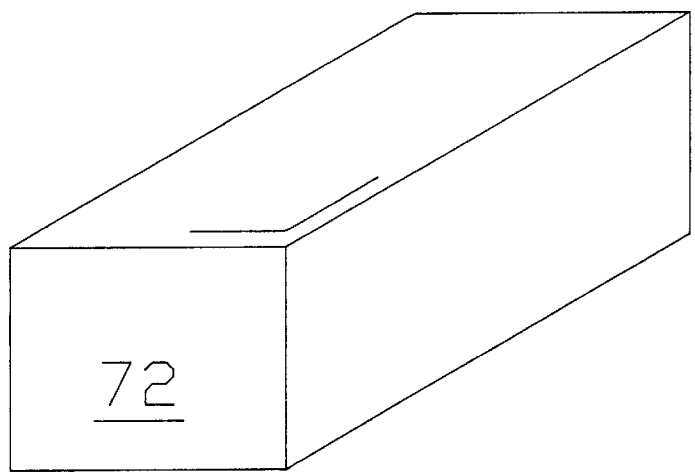
FIG. 21a is yet another illustration of laser light lines as appearing on the top of a container.

The computer then dithers in the surge direction until the horizontal line alternately appears and disappears completely. FIG. 21a shows ideal final positioning of laser scan lines on container 72.

Before actually picking up container 72, the computer checks this position and makes corrections, in an iterative manner, similar to those described above until the precise position is attained. The computer checks the position by dithering the robot in both surge and sway and measuring the lengths of the lines. If the lines are not the correct length, further yaw adjustment is made. If dithering in surge or sway does not result in the appropriate line appearing and disappearing on the monitor, larger corrective movements in surge or sway are made until the laser lines are positioned on the corner edge of the container.

Figure 19A:
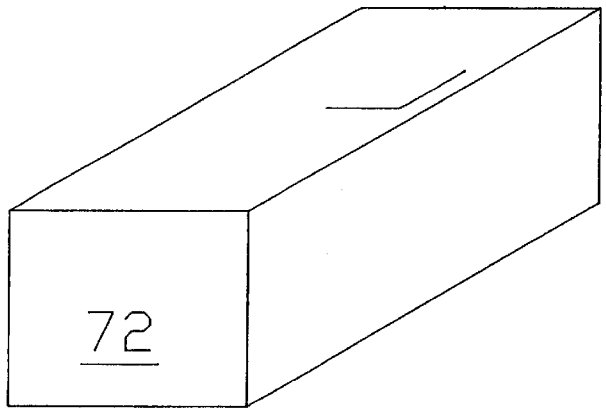
FIG. 19a is another illustration, similar to FIG. 18a, of laser light lines as appearing on the top of a container.
Figure 19B:
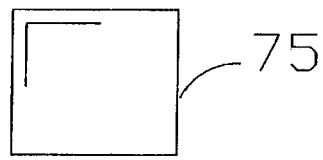
Figure 21B:
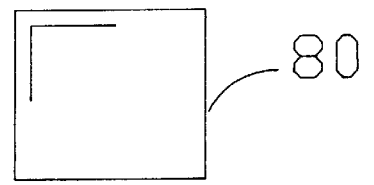
FIG. 21b is an illustration of how the laser light lines of FIG. 21a would appear to a fixed field of view at a remote viewing position, and hence as the laser light lines would appear to a camera at such remote viewing position.
Figure 22:
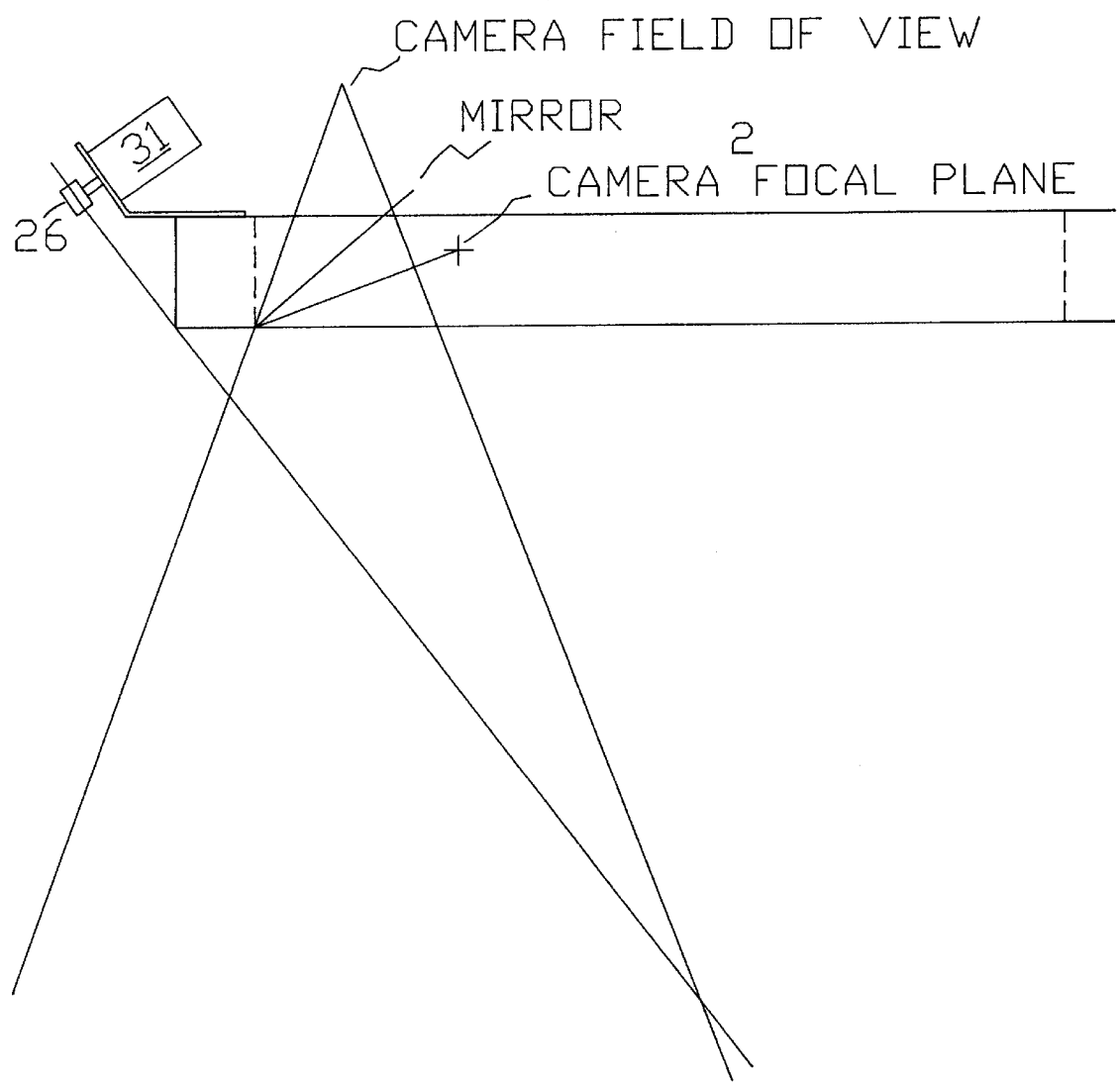
FIG. 22 is a side elevation, in schematic form, of a laser light scanner (31, 26) and sensor mounted on a robot, manifesting apparatus aspects of the invention, for practicing method aspects of the invention.
Figure 23:
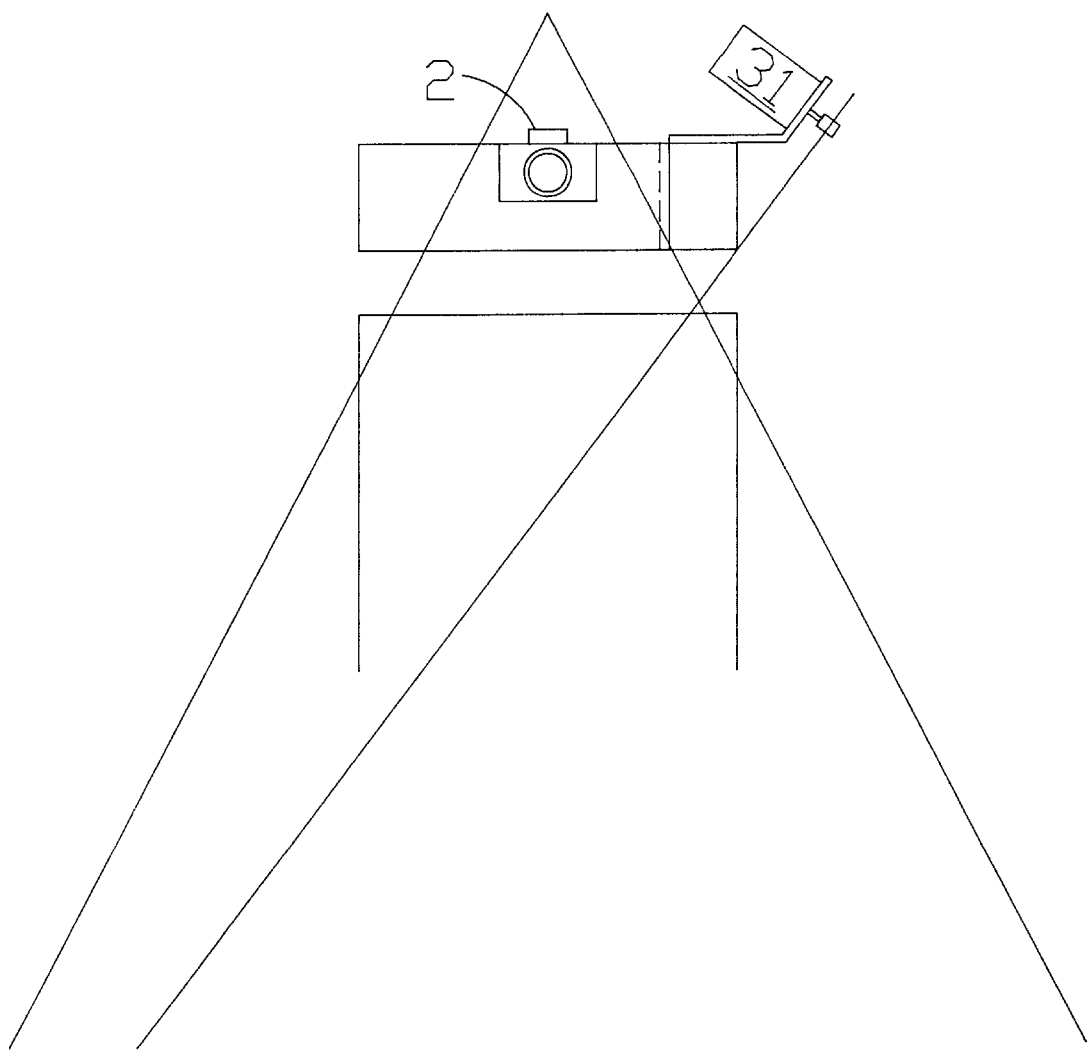
FIG. 23 is a front elevation, in schematic form, of a laser light scanner (31) and sensor (2) mounted on a robot, manifest apparatus aspects of the invention, for practicing method aspects of the invention.

Although the computer knows that monitor screen 80 in FIG. 21b indicates that the robot position is correct, the view on monitor screen 80 is exactly the same as monitor screen 75 in FIG. 19a. The difference is that the surge and sway dithering results in both horizontal and vertical lines disappearing and reappearing in 80, while only the vertical line appears and disappears in 75.

The method, as described in the example given above works essentially the same for a moving container as for a stationary container. This is because of the iterative approach applied—iterative mathematics are characterized by making a calculation, making a small change, making a second calculation, comparing the most recently calculated result with the result of the previous calculation, making another small change and repeating the process. In practicing the method of the invention, the computer does not seek a single "final" solution in one step, but rather converges on a solution. Convergence of the robot on a moving container is improved by including positioning predictions into the logic, based on history of container movement.

Apparatus Aspects of the Invention

This invention provides a method and apparatus for remotely sensing the relative attitude of objects with respect to a known point. While a preferred application of this method and apparatus is for detecting the attitude or position of objects such as containers on the deck of a ship, the method and apparatus of the invention are useful in many robotic and sensing applications.

FIG. 8 schematically illustrates one configuration of hardware embodying apparatus aspects of the invention and suitable for practicing method aspects of the invention. A television camera 2, including a lens, connects to a monitor 4 and a computer 6. The center of the camera lens is the focus point 38. The field of view 8 of the camera or other sensor is established by design of the lens in conjunction with the television camera 2 or other sensor. Television camera 2 also contains an imaging sensor such as a charged coupled device array, commonly abbreviated "CCD".

Computer 6 is equipped with an image processing card, commonly known as a "frame grabber", designated generally 7.

Television camera 2 sees what is in the field of view 8. The images of objects in field of view 8 of camera 2 are projected by lens 38 onto an image sensor, such as a CCD contained in television camera 2. Television camera 2 converts the sensed image to an analog video signal which is transmitted to monitor 4.

While monitor 4 could be used in the manual version, it is not required in an automated apparatus of the invention.

Monitor 4 interprets the analog video and displays on its screen the images seen by television camera 2.

The television camera 2 converts the images received through its lens to an analog video signal which is transmitted to computer 6. The frame grabber 7 of computer 6 converts the analog video signal to digital picture elements commonly referred to as "pixels" that can be read by computer 6. The analog video is digitized by a frame grabber 7 and stored in random access memory portion of computer 6. Software in the memory of computer 6 converts the pixels to binary code so that the image is represented by a series of 1 and 0 characters. For example, a laser scan line image might be all 1's while all other pixels would be O's. In this fashion, computer 6 recognizes what is viewed by television camera 2 and displayed by monitor 4.

FIGS. 17 through 31 generally illustrate the method and apparatus of the invention as embodied in and practiced by a robot.

Computational Aspects of the Invention

Figure 24:
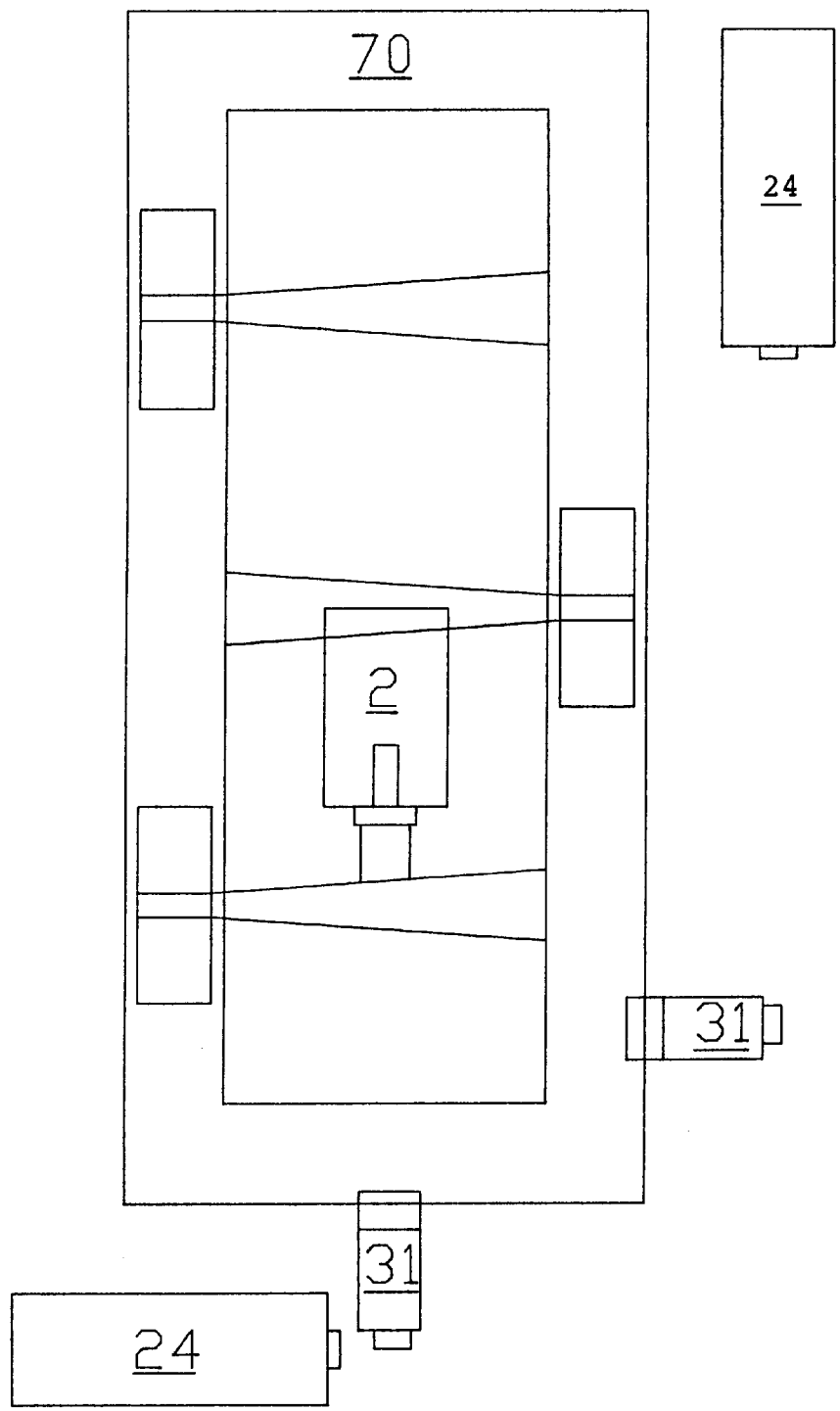
FIG. 24 is a top view, in schematic form of a robot having two laser light sources (24) and scanners (31) mounted thereon, manifesting apparatus aspects of the invention, for practicing method aspects of the invention.
Figure 25:
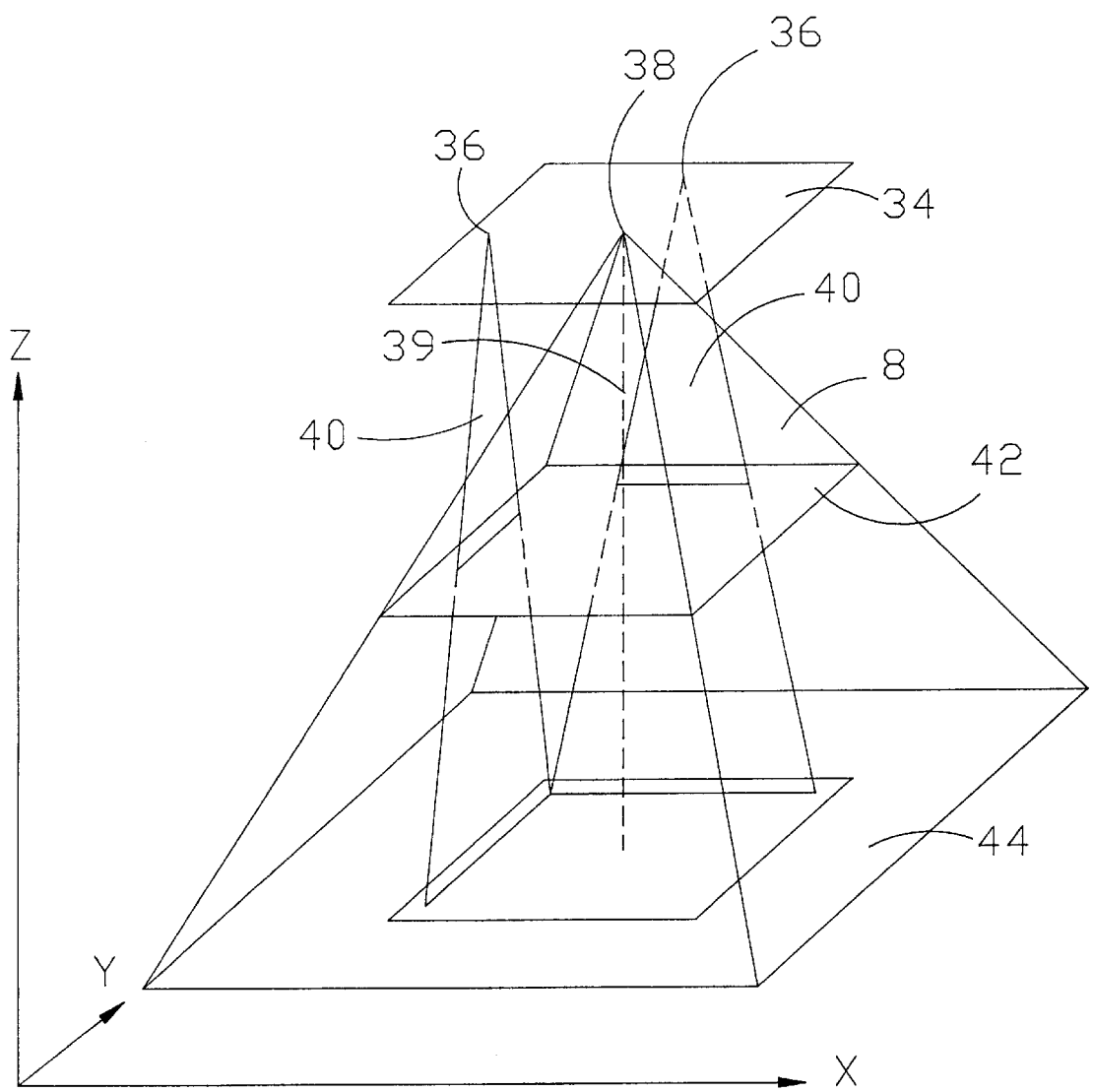
FIG. 25 is a diagram schematically illustrating use of two laser scanners to produce perpendicular lines, within a fixed field of view, in planes which are parallel to the x-y plane and are at different distances along the z axis from a plane which is also parallel to the x-y plane, in which the laser scanners and the viewing position are located.

FIG. 25 shows the basic geometry involved in the practice of the method and apparatus of the invention, when using a robot apparatus 70 as generally, illustrated in FIG. 24. A pyramid-shaped field of view 8 in FIG. 25 is that of a sensor such as camera 2 shown in FIG. 8.

Figure 17:
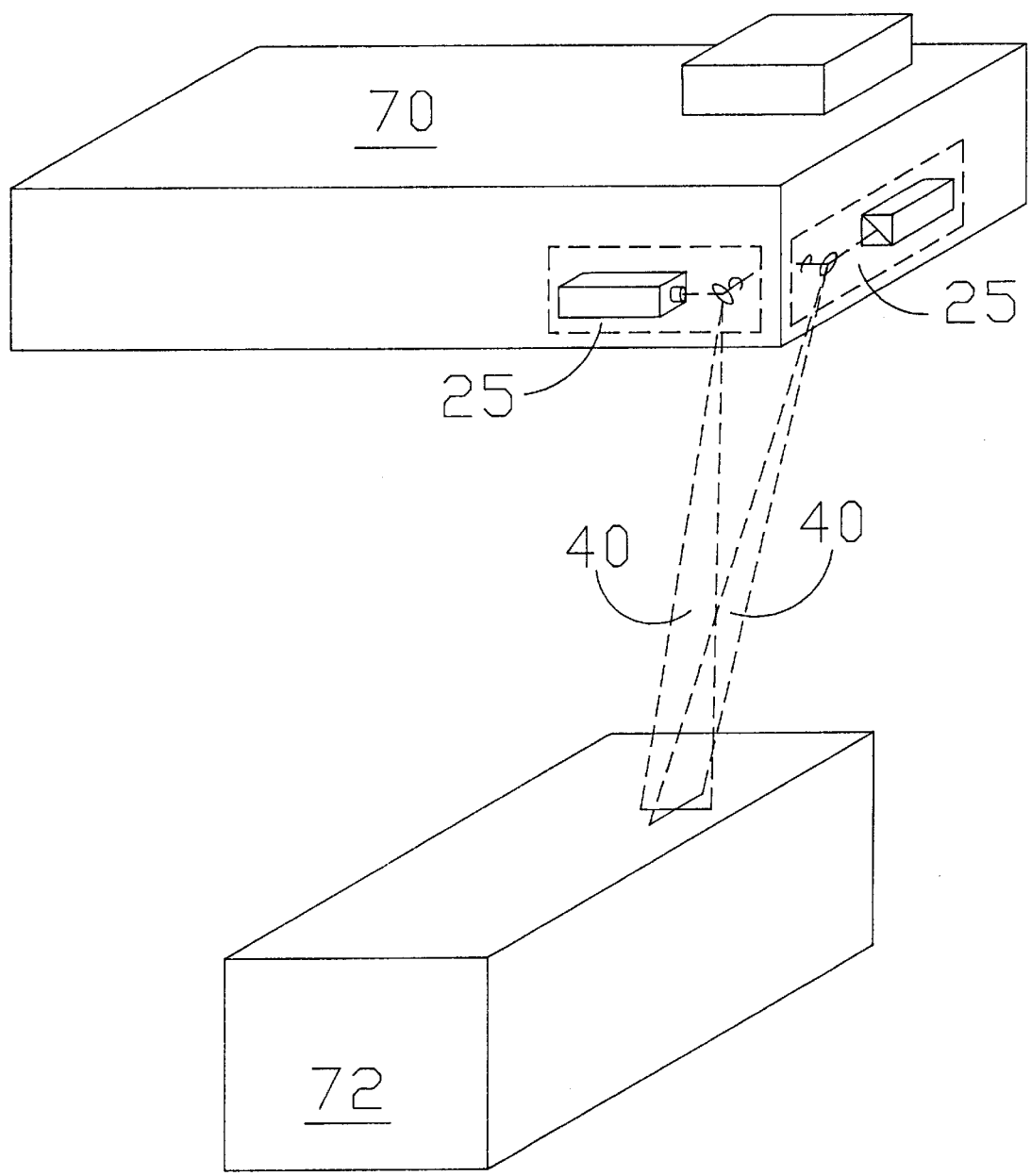
FIG. 17 is a schematic isometric view of two laser scanner, mounted to a robot, projecting light to create perpendicular light lines on a remote object.

In FIG. 25 the two light line projections or laser scan fields are designated 40 and correspond generally to identically numbered laser scan fields shown in FIG. 17. The top plane 34 of FIG. 25 illustrates that the laser scan sources 36 in FIG. 25 and focus point 38 in FIG. 25 are co-planar. The other two planes 42 and 44 in FIG. 25 represent parallel planes. Dotted line 39 in FIG. 25 denotes the center line of the sensor such as camera 2 shown in FIG. 8.

As explained in more detail above, the laser scan lines projected onto a plane normal to camera lens center line 39 in FIG. 25 appear to the sensor, such as camera 2, to be of constant length, regardless of the distance of the plane from the sensor (such as camera 2 in FIG. 8.) In other words, looking at the monitor 4 in FIG. 8, laser scan lines 32 do not change length, no matter how far away the object from the sensor.

Figure 26A:
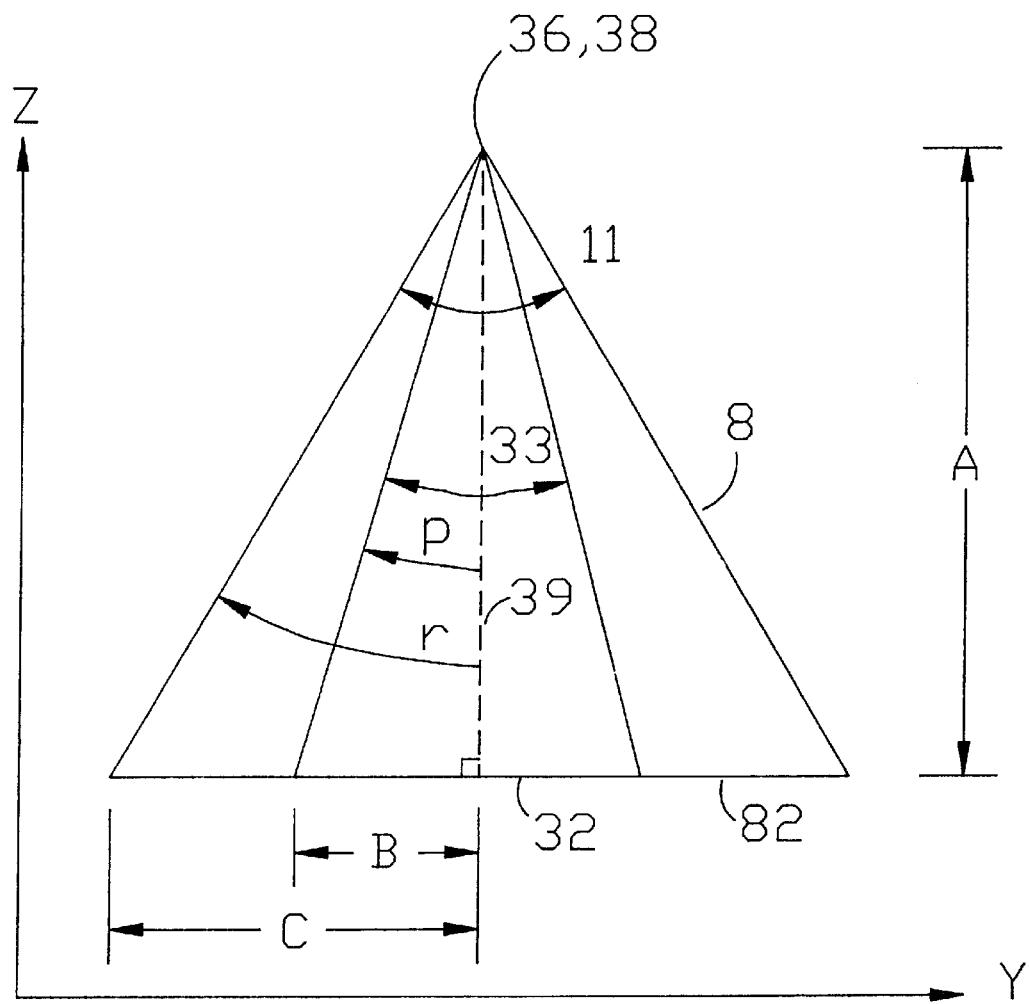
FIG. 26a is a diagram schematically illustrating a laser scan line in a plane perpendicular to the z axis, with the line being parallel to the y axis, setting forth geometric parameters with respect to the laser scan line and length thereof relative to the y axis used in the course of practicing he method aspects of the invention.

FIG. 26a is an elevational diagrammatic view of the Y-Z plane of FIG. 25. By construction of the apparatus, the field of view angle 11 in FIG. 25 and the laser scan field angle 33 in FIG. 25 are known. Since angle 11 is two times angle "r" and angle 33 is two times angle "p", the values r and p may be calculated from the design geometry of the apparatus.

For computational purposes a plane designated generally 82 is considered to be a distance A in front of focus point 38 in FIG. 26a. Plane 82 is normal to camera center line 39 in FIG. 26a.

Distance from the intersection of camera center line 39 with plane 82 to the edge of field of view 8 is designated C in FIG. 26a. One-half the length of laser scan line 32 is designated B in FIG. 26a. B is proportional to C, as shown below:

Tan r=C/A

Tan p=B/A

A=C/Tan r

A=B/Tan p

C/Tan r=B/Tan p

B=C (Tan p/Tan r)

Since p and r are known, (Tan p/Tan r) is a constant. Therefore: B=C (constant)

Hence, distance B is directly proportional to distance C, regardless of distance A (which is the distance to plane 82 from sensor focus point 38.)

Figure 26B:
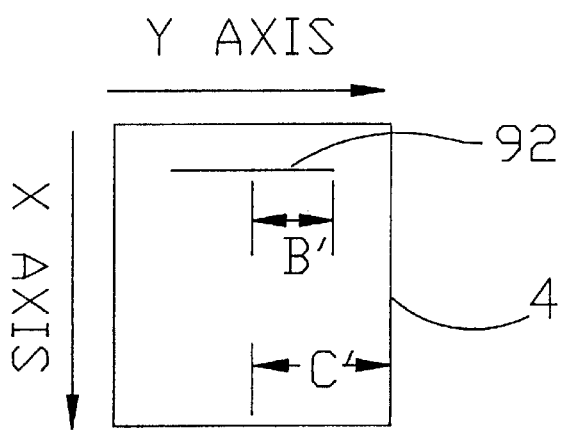
FIG. 26b is a diagram schematically illustrating the image of the laser scan line of FIG. 26a appearing at the fixed field of view position.

In the monitor screen depicted in FIG. 26b, the horizontal line designated 92 represents the laser scan line 32 shown in FIG. 26a. One-half the length of line 92, which can be measured from the monitor screen, equals B in FIG. 26a. Distance from the center to the edge of the monitor screen is designated generally C. Distance C as measured from the monitor screen represents distance from the intersection of the camera lens center line 39 to field of view 8 along plane 82.

The camera field of view angle 11 and the laser scan field angle 33 are the same on the monitor 4 as in the camera lens and laser scanner 25. The same equations apply except that B' and C' are substituted for B and C. B'=C' (Tan p/Tan r). Therefore, in FIG. 26b, B' and C' are directly proportional to each other.

Width of the monitor screen equals 2C' and the length of the line 92 representing laser scan line 32 equals 2B'. The width 2C' is fixed by the size of the monitor screen. The length 2B' of line 92 does not change with the distance of the plane 82 from the focus point 38. The length of line 92 remains constant because the laser scan line 32 occupies the same percentage of the field of view 8 of the camera 2 as distances B and C are directly proportional to each other.

If the horizontal laser scan line in FIG. 25 had been used instead of the vertical laser scan line, the same computations are performed providing the same answer. The only difference is that the X-Z plane of FIG. 25 is used as opposed to the Y-Z plane of FIG. 25 as shown in FIG. 26b. Therefore, the horizontal line 94 in FIG. 28b representing laser scan line 32 in FIG. 28b occupies the same percentage of the field of view 8 of the camera 2 because the distances B and C are directly proportional to each other.

Lines on the monitor screen which remain at a constant length have a couple of advantages. Assume the vertical line 92 on the monitor screen in FIG. 27b runs from one inch from the bottom of the screen to one inch below the top of the screen. It will be shown later that line 92 will move left and right with distance A. However, the bottom of the line 92 will always be one inch from the bottom of the screen and the top of the line will always be one inch from the top of the screen, regardless of distance A. In performing the processing, the computer 6 in FIG. 8 needs to find the end points of the line. Knowing that the end points are always one inch from the top and one inch from the bottom of the screen makes it efficient for the computer 6 in FIG. 8 to locate the end points of the line.

Knowing that the length of the vertical laser scan line 32 in FIG. 18 should appear to be a fixed length on a monitor screen is also helpful for lining up with an object. If the vertical line 92 is shorter than the expected length, the computer 6 concludes that the laser scan line 32 is not on the object or is not fully on the object.

The above properties are also valid if the plane is not normal to the center line of the lens 39, which occurs when roll and pitch can be introduced into the attitude of the plane. As in the example of the vertical line 92 running from one inch from the bottom of the monitor screen to one inch from the top, the vertical line 92 seen on the screen reacts to pitch. Assuming the vertical laser scan line 32 is sensitive to pitch, the vertical line 92 on the screen will tilt out of a vertical position, but the end points will remain the same distance from the top and bottom of the screen.

In order to demonstrate how the distance between a plane 82 in FIG. 26a to the focus point 38 in FIG. 26a of the camera 2 in FIG. 8 can be calculated, assume the plane is normal to the center line of the camera 2 in FIG. 8. As shown in FIG. 27a, the X-Z view, the laser scan source 36 is offset from the focus point 38 of the camera 2 a fixed, known distance. The laser beam emitted from the laser scanner 25 in FIG. 10c is parallel to the center line 39 in FIG. 27a of the camera 2 and intersects the limit of the field of view 8 of the camera 2 at a distance K from the camera's image plane containing focus point 38. K is determined by experimentation, calculation or design.

Referring to FIG. 27a, C is the distance along the plane from the point the center line 39 intersects the plane 82 to the point the plane is intersected by the field of view 8. Assuming again the vertical laser scan line 32 will appear on the monitor screen as vertical line 92 drawn from the bottom of the screen to the top of the screen, distance C is represented by C' in FIG. 27b which is one-half the width of the screen. The distance from the point the vertical laser scan line 36 hits the plane 82 to the intersection of the scan line 36 with the field of view 8 of the camera 2 is called D. On the monitor screen 4, distance D is represented by D', which is the distance from left side of the screen to the vertical line 92 representing the laser scan line 36 in FIG. 27a.

Given the field of view 8, the constant K, and the distances C and D we can calculate the distance E.

Tan r=C/(E+K)=D/E

Solving for E:

E=(K D/C/(1−D/C)

The distance from camera 2 is: E+K

Since only the ratio of D and C is required, and not the absolute values, the measurement can be taken directly from the monitor screen using D' and C' in place of D and C.

A horizontal line which remains a constant length on the monitor screen has the same advantages as a vertical line. E=(K D'/C')/(131 D'/C')

Assume a horizontal line designated generally 94 in FIG. 28b on the monitor screen represents horizontal laser scan line 32 and runs from one inch from the left side of the screen to one inch from the right side of the screen. It will be shown later that this line will move up and down with distance A in FIG. 28a. However, the leftmost point of the line will always be one inch from the left edge of the screen and the rightmost point of the line will always be one inch from the right edge of the screen regardless of distance A shown in FIG. 28a. In performing the processing, computer 6 in FIG. 8 needs to find the end point to the line. Knowing that the end points are always one inch from the right edge and one inch from the left edge of the screen makes it easy for the computer 6 in FIG. 8 to locate the end points of the horizontal line 94.

Figure 28A:
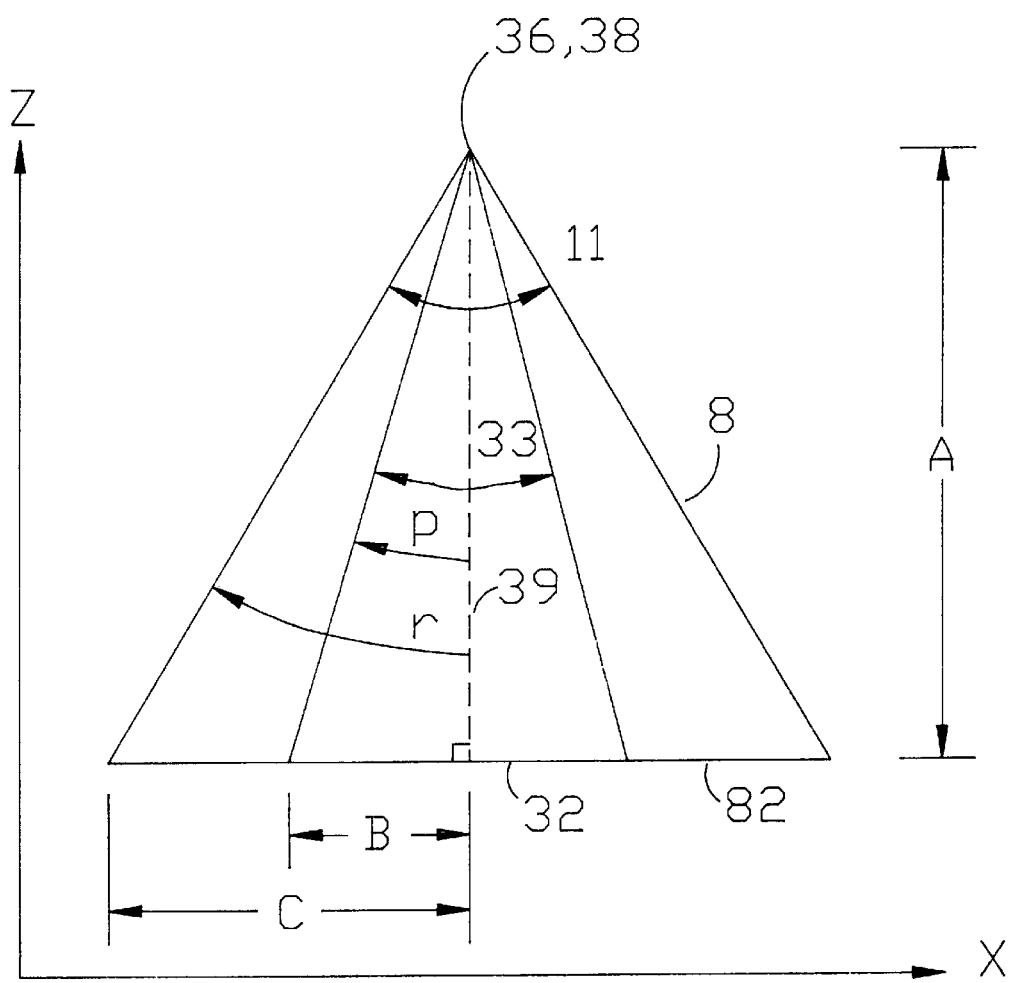
FIG. 28a is another diagram, similar to FIG. 26a, schematically illustrating a laser scan line in a plane perpendicular to the z axis, with the line being parallel to the x axis, setting forth geometric parameters with respect to the laser scan line and length thereof relative to the x axis used in course of practicing the method aspects of the invention.
Figure 28B:
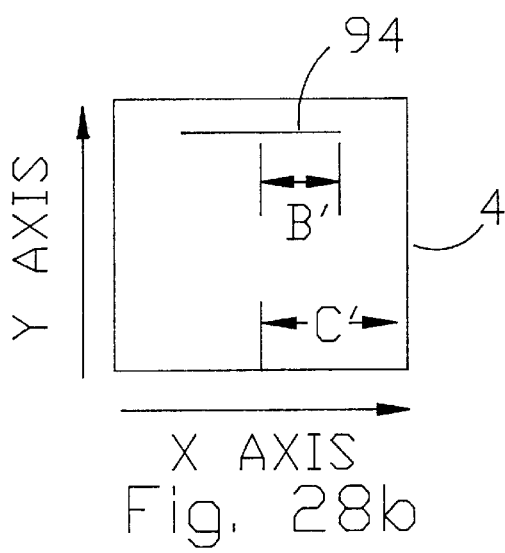
FIG. 28b is a diagram, similar to FIG. 26b, schematically illustrating the image of the laser scan line of FIG. 28a appearing at the fixed field of view position.

Knowing that the length of the horizontal laser scan line 32 in FIG. 28a should appear to be a fixed length on the monitor screen is also helpful for lining up with an object. If horizontal line 94 is shorter than the expected length, the computer 6 concludes that the horizontal laser scan line 32 is not on the object or is not fully on the object.

Both properties are also valid if the plane is not normal to the center line of the lens 39. That is, roll and pitch can be introduced into the attitude of the plane. As in the example of the horizontal line 94 running from one inch from the left edge of the monitor screen to one inch from the right edge of the monitor screen, the horizontal 94 line seen on the screen reacts to roll. Assuming the horizontal laser scan line 32 is sensitive to roll, the horizontal line 94 will tilt out of a horizontal position, but the end points will remain in the same direction from the left edge and right edge of the screen.

Figure 29A:
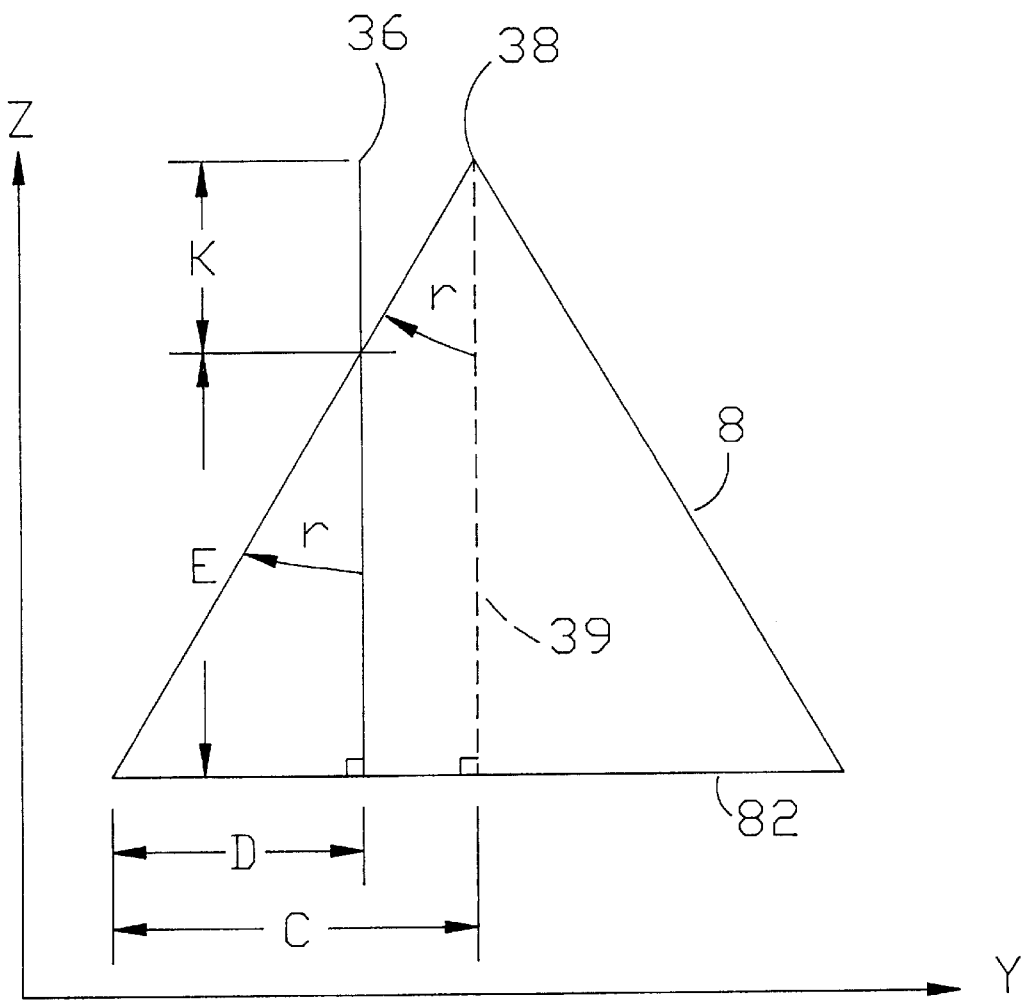
FIG. 29a is a diagram schematically illustrating laser line scan (36) in a plane perpendicular to the y axis, setting geometric parameters respecting the laser scan line.

In order to demonstrate how the distance A between a plane 82 in FIG. 28a and the focus point 38 in FIG. 28a of the camera 2 in FIG. 8 can be calculated using horizontal line 94, assuming the plane is normal to the center line of the camera 2 in FIG. 8. As shown in FIG. 29a, the Y-Z view of FIG. 25, the laser scan source is offset from the focus point 38 of the camera 2 a fixed, known distance. The laser beam emitted from the laser scanner 25 in FIG. 10c is parallel to the center line 39 in FIG. 29a of the camera 2 in FIG. 8 and intersects the limit of the field of view 8 of the camera 2 at a distance K from the camera's image plane containing focus point 38. K is determined by experimentation, calculation or design.

Referring to FIG. 29a, C is the distance along the plane from the point the center line 39 intersects the plane 82 to the point the plane is intersected by the field of view 8. Assuming again that the horizontal laser scan line will appear on the monitor screen as a horizontal line 94 drawn between one inch from the left side of the screen and one inch from the right side of the screen, and length C' is one-half the height of the screen. The distance from the point the horizontal laser scan line 36 hits the plane 82 to the intersection of the scan line 36 with the field of view 8 of the camera 2 is called D. On the monitor screen, distance D is represented by D' in FIG. 29b, which is the distance between the top edge of the screen and the horizontal line 94.

Given the field of view 8, the constant K, and the distances C and D we can calculate the distance E in FIG. 29a.

$$\text{Tan } r = C/(E+K) = D/E$$

Solving for E:

$$E = (K\ D/C)/(1-D/C)$$

Distance from camera 2 is: E+K

Since only the ratio of D and C is required, and not the absolute values, the measurement can be taken directly from the monitor screen using C' and D':

$$E = (K\ D'/C')/(1-D'/C')$$

Figure 29B:
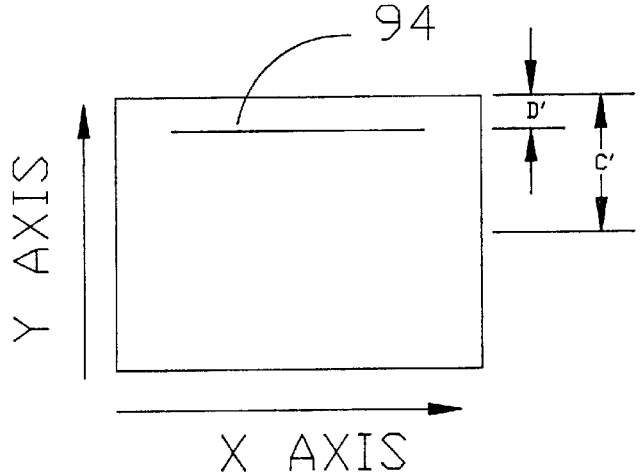
FIG. 29b is a diagram schematically illustrating the image laser scan line of FIG. 29a appearing at the fixed field of view position.

If the monitor were viewed while the plane was moved away from the camera 2, a vertical line representing a vertical laser scan line 92 seen on the screen in FIG. 27b would move to the right of the screen and a horizontal line representing a horizontal laser scan line 94 would move toward the bottom of the screen in FIG. 29b. If the plane was moved towards the camera 2, a vertical line representing a vertical laser scan line 92 would appear to move towards the left of a screen in FIG. 27b and a horizontal line 94 representing a horizontal laser scan line would appear to move towards the top of the screen in FIG. 29b.

If the laser scan lines 32 viewed on the screen were perfectly parallel, any point on the line could be used for the measurement of heave distance between the focus point 38 and plane containing the object. For ease of computation, however, the computer 6 could use just one end point.

It turns out that the vertical laser scan line 32 will not appear to be vertical on the monitor screen if the object plane is not normal to the camera center line- that is, if pitch is introduced. By looking at both end points of the vertical laser scan line 32, the distance from the camera 2 can be determined for both end points. By knowing the distance of both end points, the pitch can be determined.

Figure 30:
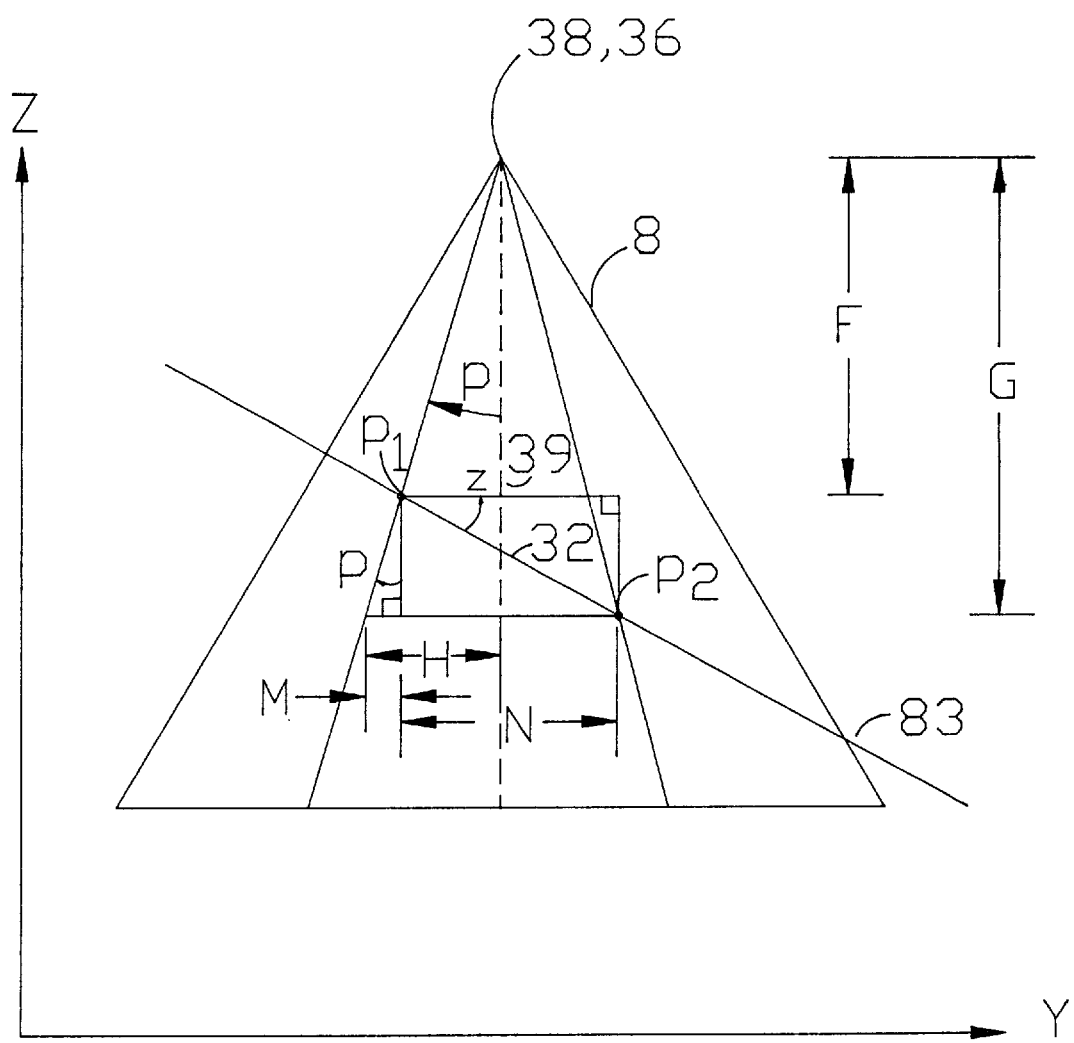
FIG. 30 is a schematic diagram illustrating geometric principles and results when a laser scan line is, created having length measured along the y axis.

Refer to FIG. 30, the Y-Z view of the method and apparatus of the invention. In FIG. 30 a plane designated generally 83 is passed through the field of view 8 of the camera 2. The laser is projected onto the plane; the end points of the line are shown as $P_1$ and $P_2$. By using the methods previously described, we can determine distances F and G. F is the vertical distance of point $P_1$ from focus point 38 of the camera 2. G is the vertical distance of the point $P_2$ from the focus point 38 of the camera 2. N is the horizontal distance between $P_1$ and $P_2$. Distances M and H are also shown in the FIG. 30.

To determine the pitch angle (z) of the plane containing the object, the following math applies:

$$H = G\ \text{Tan } p$$

$$M = (G-F)\ \text{Tan } p$$

$$N = 2H - M$$

$$\text{Tan } z = (G-F)/N = (G-F)/(2G\ \text{Tan } p - (G-F)\ \text{Tan } p)\ z = \text{ArcTan } ((G-F))/((\text{Tan } p)\ (G+F)))$$

All that is needed to calculate the pitch (z) of the plane is F, G and the angle p. The p is a known constant. F and G can be measured using the methods previously described.

Using one laser scan line 32, pitch or roll can be measured, but not both. In the above discussion, it was assumed that the method and apparatus of the invention was sensitive to pitch. In order to measure roll as well as pitch, a second laser projection is required. The second laser would be positioned so that, when projected onto a plane normal to the camera's center line, its line would be perpendicular to the line drawn by the first laser.

Figure 31:
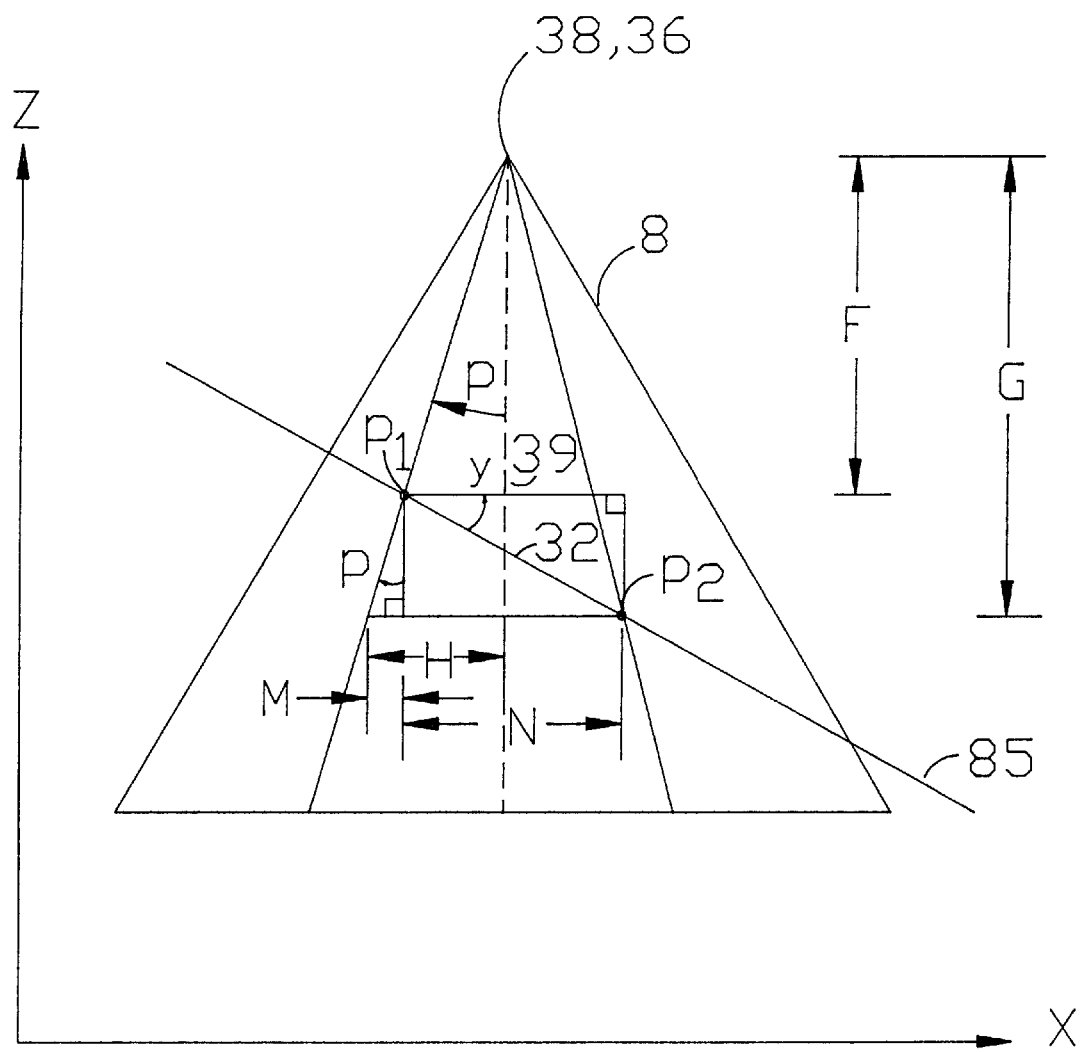
FIG. 31 is a schematic diagram, similar to FIG. 30, illustrating geometric principles and results when a laser scan line Recreated having length measured along the x axis.

In FIG. 31 the X-Z view of the horizontal laser scan line 32 is shown, and a plane designated generally 85 is passed through the field 8 of the camera 2. The laser beam is projected onto the plane 83. The end points of the laser scan line are shown as $P_1$ and $P_2$. By using the methods previously described, we can determine distances F and G. F is the distance of the point $P_1$ from focus point 38 of the camera 2. G is the distance of the point $P_2$ from focus point 38 of camera 2. N is the horizontal distance between $P_1$ and $P_2$. Distances M and H are also shown on FIG. 31.

To determine the roll angle (y) of the plane containing the object, the following math applies:

$H = G \tan p$ $M = (G-F) \tan p$ $N = 2H - M$ $\tan y = (G-F)/N = (G-F)/(2G \tan p + (G-F)\tan p)$ $y = \text{ArcTan}((G-F)(\tan p)(G+F))$ All that is needed to calculate the roll angle of the plane is F, G and the angle p. The angle p is a known constant. A and B can be measured using the methods previously described.

Using the Invention to Pick Up a Remote Container

Assume we must pick up an object such as a container in FIG. 1. Assume also that the sensor method and apparatus of the invention is located on a container handling device capable of any combination of 6 degrees of freedom: sway, surge, heave, roll, pitch and yaw as shown in FIGS. 2–7. Assume that the handling device is positioned such that at least a portion of the object container is being "painted" by the laser within the field of view of the camera. Assume that the container is at a random orientation.

The apparatus and method to remotely sense the relative attitude of objects employs heuristics in order to correct each degree of freedom independently and in sequence. FIGS. 32 through 40 are flow charts demonstrating the heuristic method employed by the method and apparatus of the invention. Such a method and apparatus of the invention is fine for stationary or slowly moving objects. Rapidly moving objects require more sophisticated sequencing such as multitasking and/or a number of iterations, however, the basic method remains the same.

Figure 32:
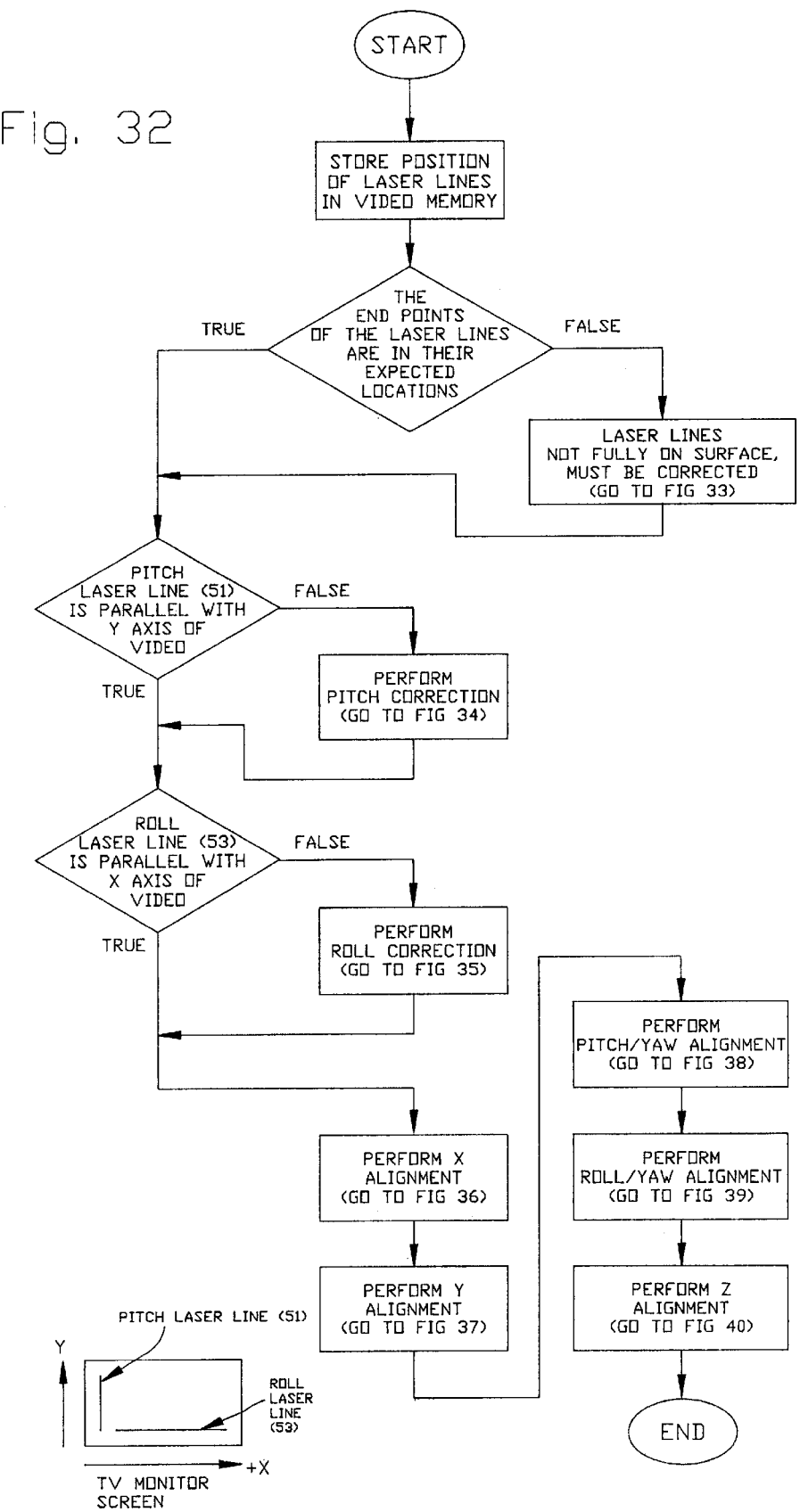
FIG. 32 is a block diagram of a computer program used in practicing aspects of the method for detecting orientation a object in accordance with the invention.

The block diagram in FIG. 32 illustrates the main steps to remotely sense the relative attitude of objects. A filter can be placed in front of the lens method and apparatus of the invention of camera 2 in FIG. 8. Camera 2 in FIG. 8 only detects the laser scan lines such as 32 in FIG 10c. The computer 6 in FIG. 8 receives the analog video of everything appearing in the field of view of camera 2 in FIG. 8. Laser scan lines 32 are shown in FIGS. 32 through 35 as they would appear to the computer 6 in or a person viewing the monitor 4 in FIG. 8. In FIGS. 32 through 40, a vertical line seen on a monitor screen is referred to as the pitch line because it is used to determine if an object is pitched. Similarly, a horizontal line seen on a monitor screen is referred to as a roll line because it is used to determine whether an object is rolled. Assume that this method and apparatus of the invention utilizes the rectangular coordinate method and apparatus of the invention shown in FIG. 1. However, any coordinate method and apparatus of the invention may be used to achieve the same effect.

Figure 33:
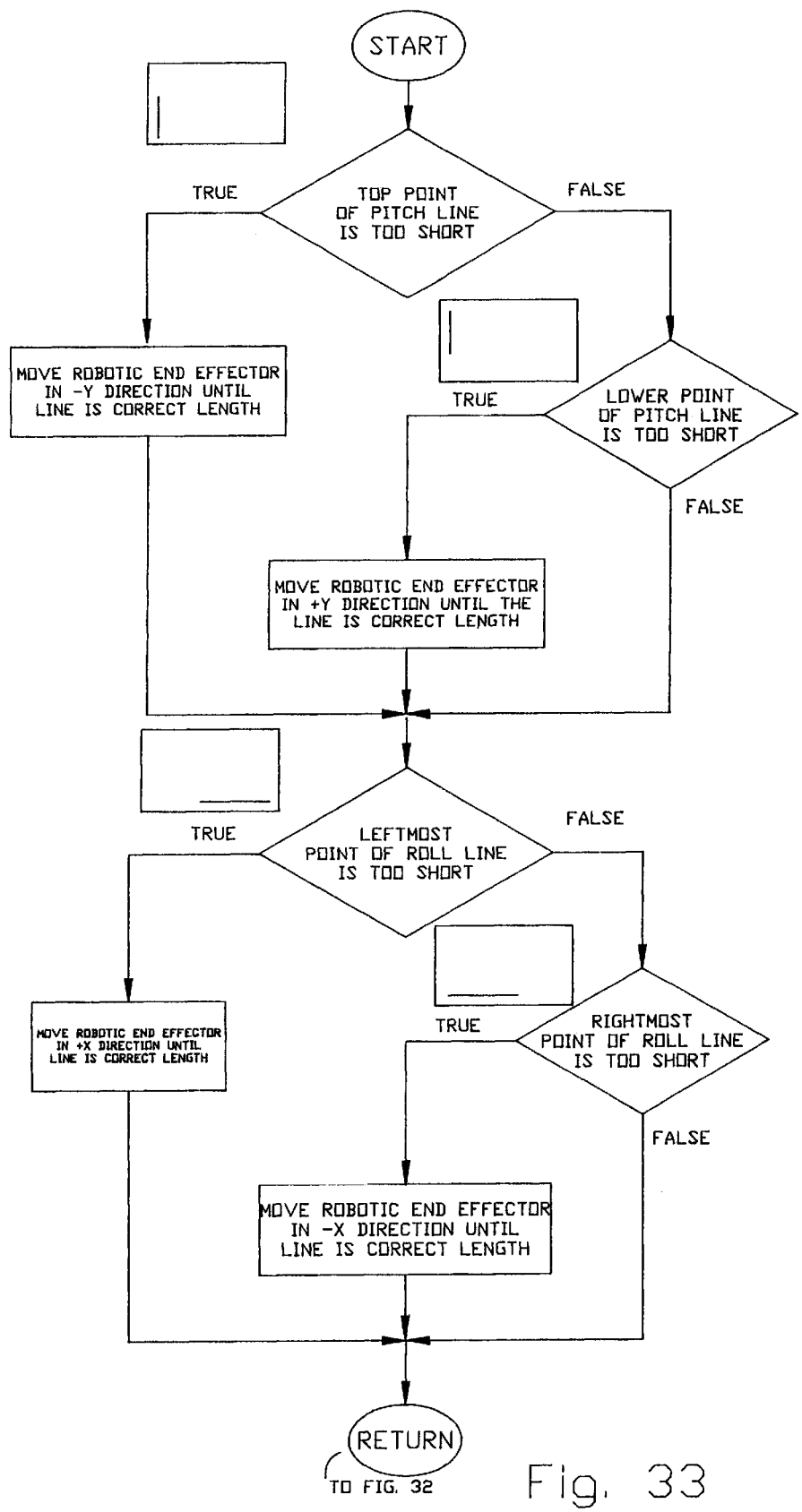
Figure 34:
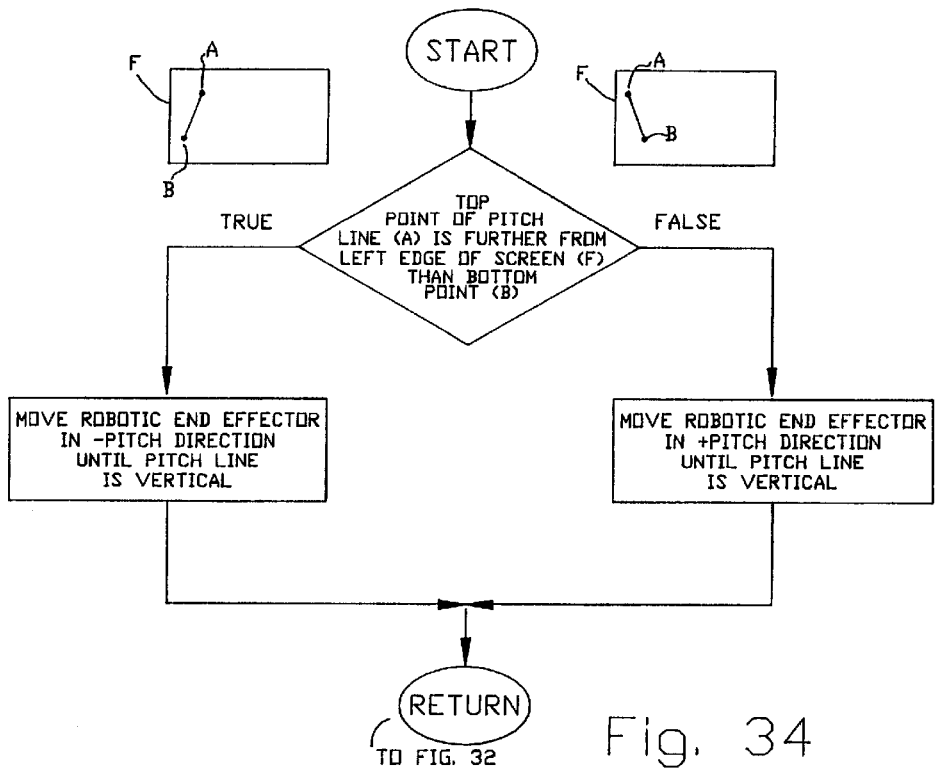
Figure 35:
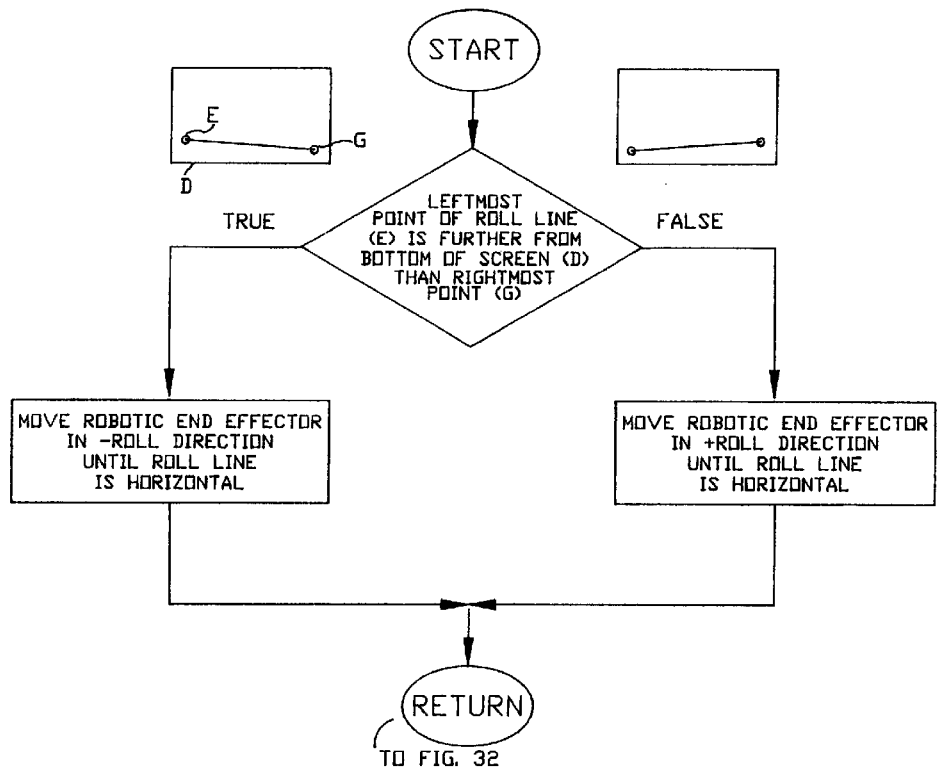

Once the computer 6 in FIG. 8 sees that the laser scan lines 32 are not fully on the object, the computer 6 in FIG. 8 goes from the main program in FIG. 32 to a subroutine shown in FIG. 33 which is designed to maneuver the robotic end effector over the object so that all laser scan lines are on the object. If the top point of the vertical pitch line is too short, computer 6 maneuvers the robotic end effector and camera in −Y direction until the pitch line is the correct length. If the lower point of the pitch line is too short, the computer 6 maneuvers robotic end effector in +Y direction until the pitch line is the correct length. If the pitch line is the correct length on the monitor screen, then no correction is necessary.

Once the pitch line is the correct length, computer 6 inspects the roll line position. If the left end point of the roll line is too short, computer 6 maneuvers the robotic end effector in +X direction until length of the line is correct. If the right end point of the roll line is too short on the monitor screen, computer 6 maneuvers robotic end effector in the −X direction until the roll line is the correct length on the monitor screen. Once the roll line is correct, the subroutine in FIG. 33 ends and returns to the main routine in FIG. 32.

The main routine now determines whether the pitch line is parallel with the Y axis or vertical edges of the monitor screen as shown on the monitor screen in FIG. 32. If the pitch line is not in parallel with the Y axis, the main routine goes to the subroutine in FIG. 34 to correct the pitch line. If the top point of the pitch line is further from the left edge of the screen than the bottom point, computer 6 computes the pitch angle z and maneuvers the robot end effector counterclockwise about the X axis or in the −Pitch direction until pitch line is vertical on the monitor screen. If the bottom point of pitch line is further from left edge of screen than the top point, computer 6 computes the pitch angle z and maneuvers robotic end effector clockwise about the X axis or in the +Pitch direction until pitch line is vertical. Once the top point of pitch line is the same distance from left edge of the screen as the bottom point of the pitch line, this subroutine returns to the main program in FIG. 32.

Computer 6 determines whether the roll line is in parallel with the X axis as shown on the monitor screen in FIG. 32. If the roll line is not in parallel with the X axis, the main routine goes to subroutine in FIG. 35. If the left-most point of the roll line is further from the bottom of the screen than the rightmost point, the computer 6 computes the roll angle y and maneuvers the robotic end effector counterclockwise about the Y axis or in the −Roll direction until the roll line is horizontal. If the right-most point of the roll line is further from the bottom of the screen than the left-most point, computer 6 computes the roll angle y and maneuvers the robotic end effector clockwise about the Y axis or in the +Roll direction about the Y axis until the roll line is parallel to the X axis. Once the roll line is parallel to the X axis, this subroutine returns to the main routine in FIG. 32.

Figure 36:
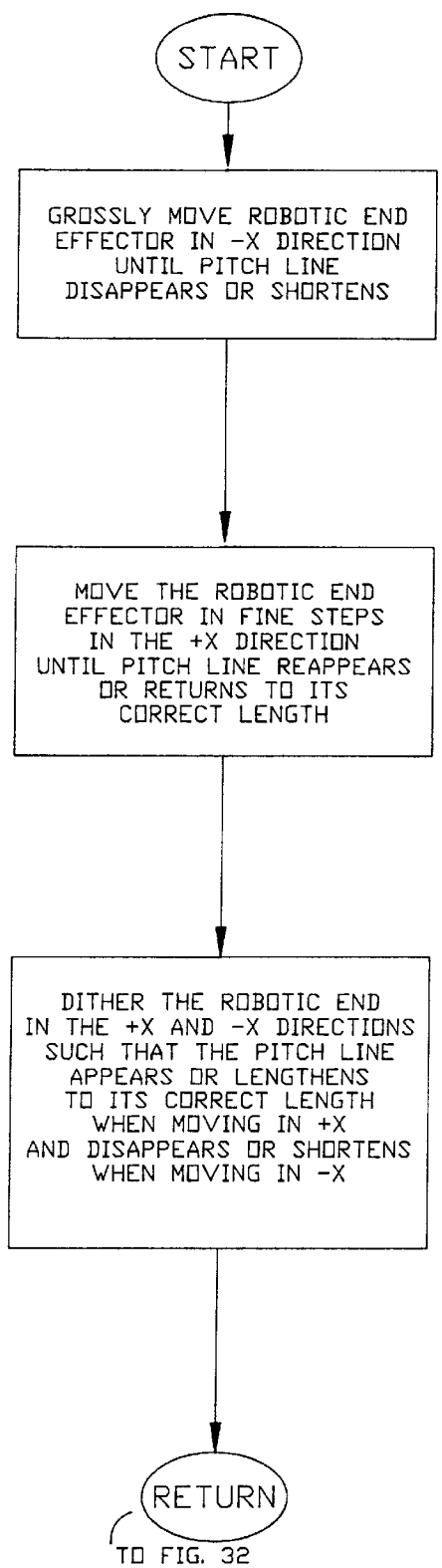

Computer 6 performs an X alignment by going to the subroutine in FIG. 36. First, computer 6 maneuvers the robotic end effector in the −X direction until roll line disappears or shortens. Second, computer 6 maneuvers robotic end effector in fine steps in the +X direction until roll line reappears or returns to its correct length. Third, the computer dithers the camera assembly in the +X and −X direction or in the surge direction so that the roll line appears or lengthens while moving in the +X direction and disappears or shortens when moving in −X direction. This routine returns to the main program in FIG. 32.

Figure 37:
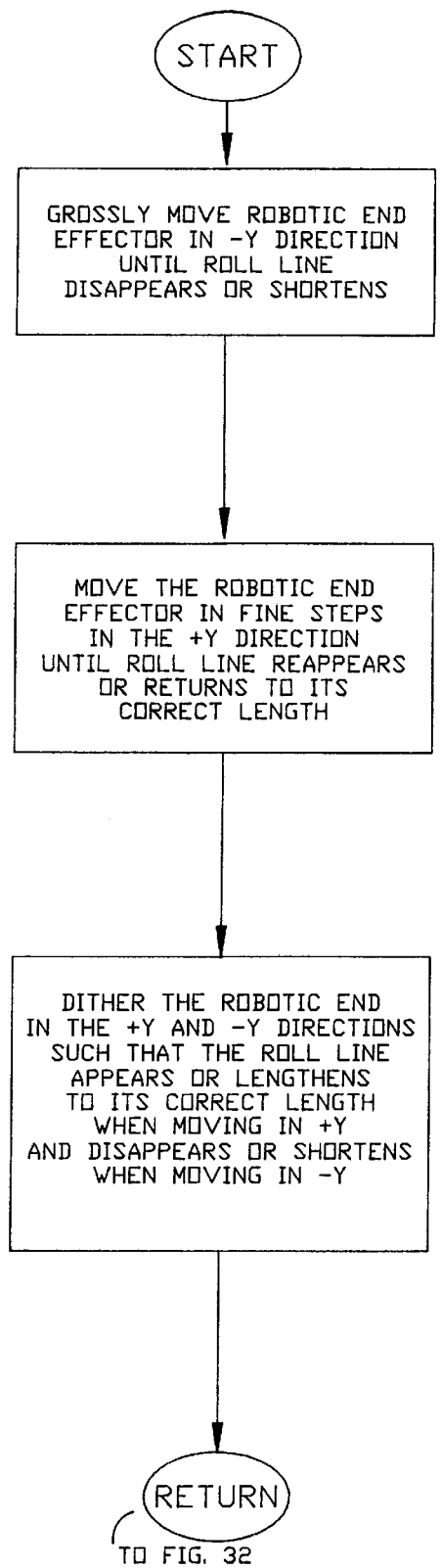

The main program goes to the subroutine in FIG. 37 to perform Y alignment of the robotic end effector along the Y axis. The computer 6 maneuvers the robotic end effector grossly in the −Y direction until the pitch line disappears or shortens. Then, computer 6 maneuvers the robotic end effector in the fine steps in the +Y direction until the pitch line reappears or returns to its correct length. The computer 6 dithers robotic end effector in the +Y and −Y direction or in the sway direction so that the pitch line appears or lengthens to its correct length when moving in +Y and disappears or shortens when moving in −Y direction. This routine returns to the main program.

Figure 38:
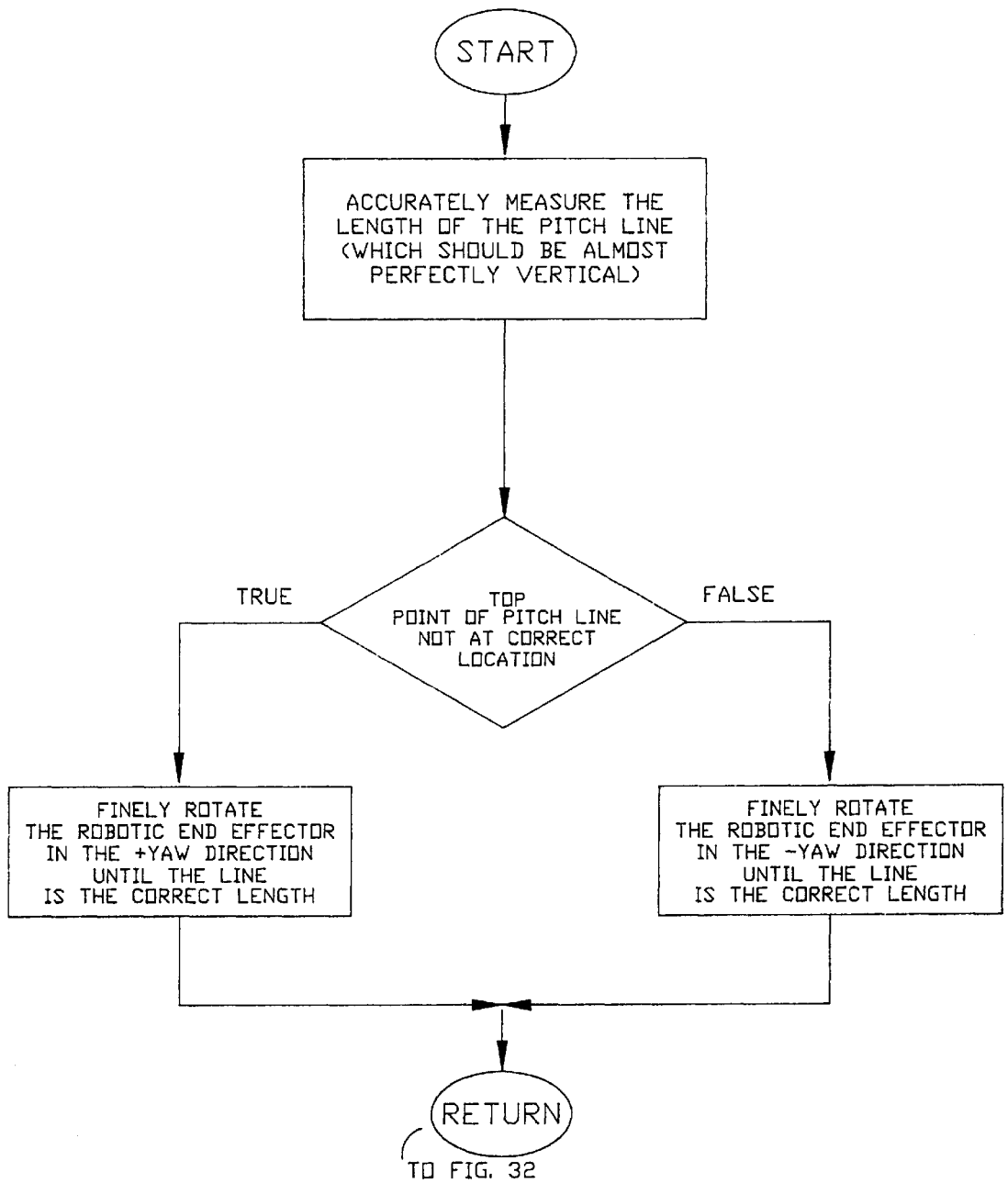

The apparatus of the invention may use computer 6 to align the robotic end effector in yaw in accordance with method aspects of the invention as embodied in computing software for which FIG. 38 is a flow chart. At this juncture, computer 6 using the robotic end effector has accurately measured the length of pitch line, which should be almost perfectly vertical. If the top of the pitch line is not correctly positioned, computer 6 maneuvers robotic end effector by finally rotating it clockwise about the Z axis or in the +yaw direction until the pitch line is the correct length. If the bottom of pitch line is not correctly positioned, computer 6 maneuvers the robotic end effector by finally rotating it counterclockwise about the Z axis or in the −Yaw direction until the pitch line is the correct length. Once the pitch line is at the correct length, this subroutine returns to the main program in FIG. 32.

Figure 39:
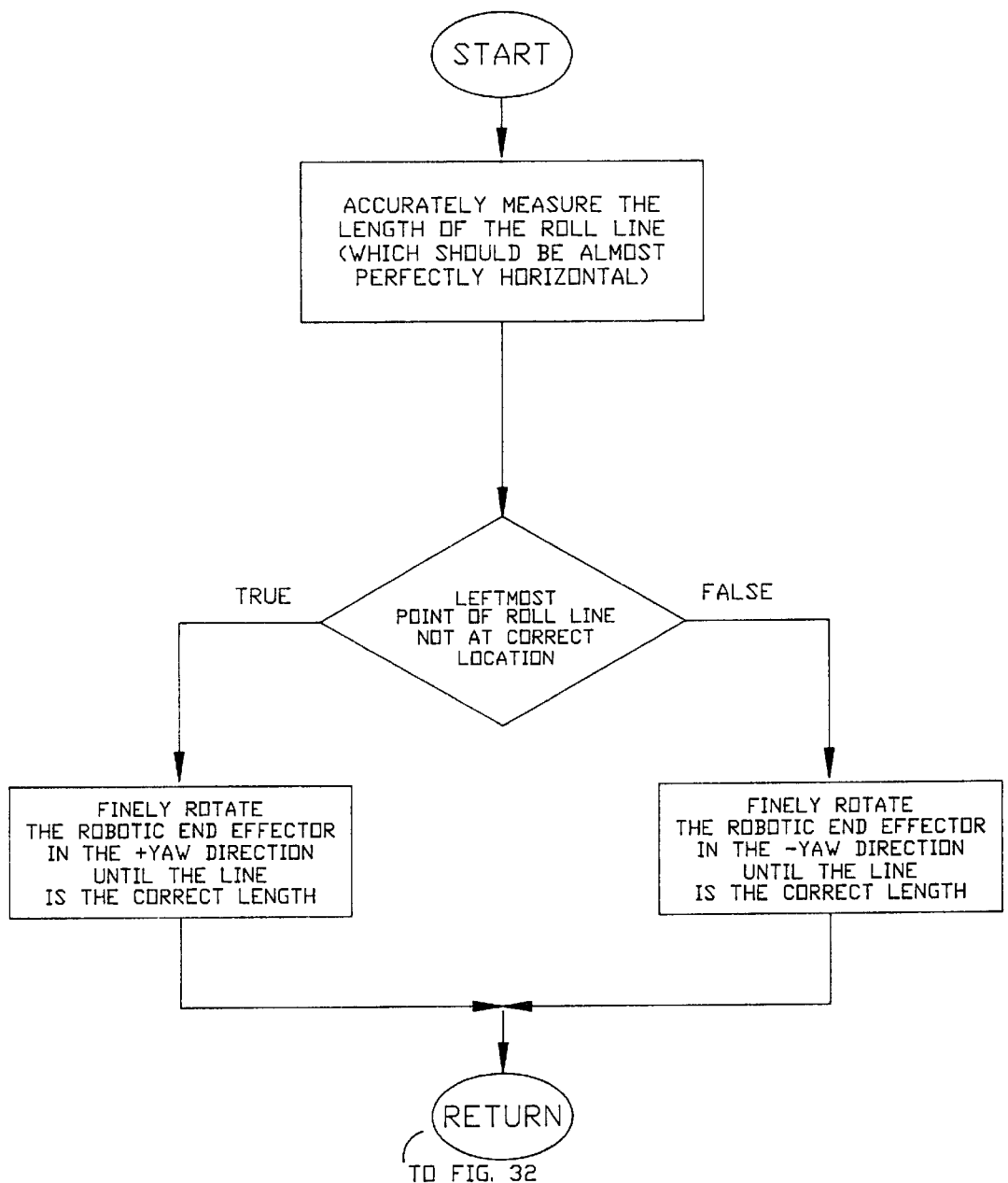

The computer 6 could also perform the yaw alignment by going to the subroutine in FIG. 39. At this juncture, the computer 6 using the robotic end effector has accurately measured the length of the roll line, which should be almost perfectly horizontal. If the leftmost point of the roll line is not correctly positioned, computer 6 maneuvers robotic end effector by finely rotating it clockwise about the Z axis or in the +Yaw direction until the roll line is the correct length. If the rightmost point of the roll line is not correctly positioned, the computer 6 maneuvers the robotic end effector by finally rotating it counterclockwise about the Z axis or in the −Yaw direction until the roll line is the correct length. Once the roll line is at the correct length, this subroutine returns to the main program.

Figure 40:
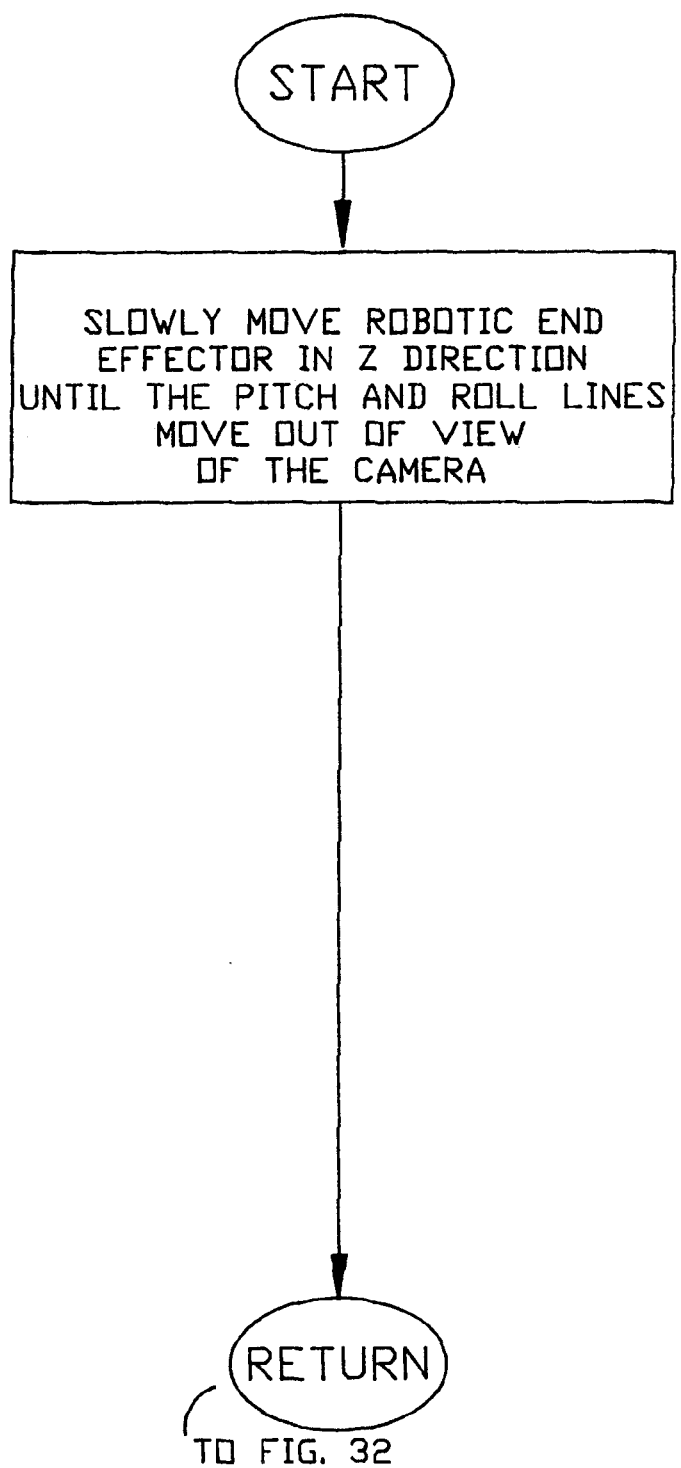

The computer 6 goes to the subroutine in FIG. 40 to perform the Z alignment. The computer 6 computes the distance between the robotic end effector and object and slowly maneuvers the robotic end effector in the Z direction until the pitch and roll lines move out of the field of view 8 of the camera 2 in FIG. 8. At this time the object should be in contact with the robotic end effector. However, if the object is constantly moving, the main routine may have to be repeated many times before the robotic end effector picks up the object.

In a working sample of the device, a Javelin Model JE2362A Black and White camera used with a computer 16 mm Auto Iris Lens Mag 1613ABC is an appropriate television camera 2. An AST Premium 386 Model 340 is an appropriate computer 6. The AST computer requires a Metrobyte MU-1 Frame Grabber.

Although only one pair of laser scan lines are used in this example, several pairs of laser scan lines can be used to perform this method.

Techniques other than the apparatus of laser scanner 25 can be used to create the laser scan lines including acoustic means, solid state means and optical means. Solid state means includes a laser beam hitting a lens which spreads laser beam out to form a laser scan field. Acoustic means includes sound waves sent across an aperture which interacts with laser beams to form laser scan fields and laser scan lines. Optical means employs a lens that forms a projected line of light.

Lasers are not specifically needed. Any light projection system can be used if it will provide a narrow line of light as described.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for determining position and orientation of an object from a position remote therefrom, comprising:
   a. means for projecting beams of electromagnetic waves as lines onto said object;
   b. means for directly sensing reflections of said lines from said remote object;
   c. means for converting said sensed reflections into binary code referenced to a coordinate system; and
   d. means for interpreting said binary code to determine position and orientation of said remote object with respect to said coordinate system.

2. An apparatus for determining position and orientation of an object located remotely from said apparatus, comprising:
   a. a camera;
   b. means for generating beams of visible electromagnetic radiation;
   c. means for projecting said beams onto said remote object to form lines thereon which generally traverse one another;
   d. means for sensing said lines reflected by said remote object;
   e. means for converting said sensed reflected lines into pixels referenced to a coordinate system;
   f. means for converting said pixels into binary code; and
   g. means for interpreting said binary code to determine position and orientation of said remote object with respect to said coordinate system.

3. An apparatus for determining position and orientation of an object located remotely from said apparatus, comprising:
   a. a frame;
   b. a plurality of laser light generators mounted on said frame;
   c. a plurality of oscillating mirrors mounted on said frame and paired with respective ones of said laser light generators, for reflectingly positioning laser light output from said generators onto said remote object as lines of laser light traversing one another;
   d. camera means for receiving said laser light lines reflected by said remote object and creating an electrical signal indicative of reflected laser light lines;
   e. a video-processing board for converting said electrical signal into pixels referenced to a coordinate system;
   f. means for converting said pixels into binary code; and
   g. means for mathematically processing said binary code to provide position and orientation of said remote object with respect to said coordinate system.

4. The apparatus of claim 3 further comprises means for positioning and orienting a robotic end effector to said position and orientation of said remote object based on said binary code.

5. The apparatus of claim 3 further comprises means for receiving reflections of said lines from said remote object and transmitting said reflections to a monitor which displays said reflections of said lines.

6. A method for remotely determining position and orientation of a remote object with respect to a reference coordinate system, comprising:
   a. projecting electromagnetic beams onto said object to produce a pattern of lines thereon;
   b. directly sensing the pattern of lines from a position remote from said object;

c. interpreting the sensed pattern of lines as mathematical data; and d. processing said mathematical data to provide position and orientation of said object measured relative to said reference coordinate system.

7. The method of claim 6 further comprises positioning, orienting and moving a robotic end effector to the mathematically determined position and orientation of said object relative to said reference coordinate system.

8. The method of claim 6 wherein the projected beams in step a, produce either a visible or invisible pattern.

9. A method for remotely sensing and computing the position and orientation of a remote object having a surface, the method comprising:

a. projecting electromagnetic beams onto the surface of said remote object to produce a pattern of laser light lines thereon;

b. viewing reflections of said lines detected by a television camera;

c. transmitting said reflections to a video processing board in a computing device which converts said reflections to pixels and stores said pixels in memory;

d. accessing and converting said pixels into binary code; and e. interpreting said binary code to determine position and orientation of said object relative to a predetermined coordinate system.

10. The method of claim 9 further comprises positioning, orienting and moving a robotic end effector to said determined position and orientation of said object relative to said predetermined reference coordinate system.

11. A method for remotely sensing and computing the position and orientation of a moving object relative to a predetermined coordinate system, comprising:

a. projecting electromagnetic beams onto respective oscillating mirrors which oscillate between two predetermined angles;

b. deflecting respective electromagnetic beams by oscillating said mirrors between two predetermined angles to create laser light lines on said moving object;

c. positioning said beams and said respective oscillating mirrors to create laser light lines which traverse one another on said object;

d. detecting a pattern of reflections of said laser light lines with a television camera located in a position removed from said object;

e. transmitting said reflections from said television camera to a video processing board of a computer and to a monitor;

f. converting said reflections into pixels and storing said pixels in memory of computer;

g. accessing and converting said pixels into binary code; and h. calculating the position and orientation of said object relative to a predetermined coordinate system by using a laser scan angle, field of view angle, length of laser scan line, dimension of the monitor, and said binary code.

12. The method of claim 11 further comprises positioning, orienting and moving a robotic end effector to said calculated position and orientation of said object.

13. A method for remotely determining position and orientation of a remote object using a coordinate system as a reference and for maneuvering a robotic end effector to said position and orientation, comprising:

a. maneuvering said robotic end effector in surge and sway directions until pitch and roll laser light lines viewed on a computer screen are fully on said remote object;

b. maneuvering said robotic end effector in pitch direction until said pitch line is vertically positioned on said remote object;

c. maneuvering said robotic end effector in roll direction until said roll line is horizontally positioned on said remote object;

d. maneuvering said robotic end effector in surge direction until said roll line disappears or shortens and then maneuvering robotic end effector in an opposite direction in fine steps until the roll line reappears and returns to its correct length;

e. dithering the robotic end effector such that the roll line appears or lengthens and disappears or shortens;

f. maneuvering the robotic end effector in sway direction until the pitch line disappears or shortens and then maneuvering robotic end effector in an opposite direction in fine steps until the pitch line reappears or returns to its correct length;

g. dithering the robotic end effector such that the pitch line appears or lengthens to its correct length and disappears or shortens;

h. rotating the robotic end effector in yaw direction until said pitch line or said roll line is the correct length;

i. maneuvering the robotic end effector in the heave direction until said pitch line and said roll lines move out of field of view of camera; and j. repeating steps a through i until the robotic end effector picks up said remote object.

14. A method for remotely determining position and orientation of a remote object using a rectangular X, Y and Z coordinate system in a camera's field of view as a reference and for maneuvering a robotic end effector to said position and orientation, comprising:

a. mounting a television camera to electromagnetic beam generators and to oscillating mirrors so that a focus of lens system of the television camera and points of deflection of said electromagnetic beams from said oscillating mirrors are in the same X-Y plane and the focus of the lens system of the television camera is a point on the Z axis;

b. projecting a pitch laser light line of predetermined length in parallel with the Y axis and projecting a roll laser light line of predetermined length in parallel with the X axis onto an object at a predetermined distance therefrom, by projecting electromagnetic beams at respective oscillating mirrors through a predetermined angle, the pitch and roll lines traversing one another;

c. maneuvering a robotic end effector in +Y or −Y direction until the pitch line is fully on target;

d. maneuvering the robotic end effector in +X and −X direction until the roll line is fully on object;

e. computing a pitch angle;

f. maneuvering the robotic end effector clockwise about the X axis whenever the bottom point of pitch line is further from left edge of field of view than the top point;

g. maneuvering the robotic end effector counterclockwise about the X axis until the pitch line is vertical whenever top point of the pitch line is further from the left edge of field of view than the bottom point;

h. computing roll angle;

i. maneuvering the robotic end effector clockwise about the Y axis until the roll line is horizontal whenever right-most point of the roll line is further from the bottom of field of view than the left-most point;

j. maneuvering the robotic end effector in counterclockwise direction until the roll line is horizontal whenever left-most point of the roll line is further from bottom of field of view at the right-most point;

k. aligning the robotic end effector with the X axis by completing the following steps:
   i. maneuvering grossly the robotic end effector in −Y direction until the roll line disappears or shortens as viewed by the camera,
   ii. maneuvering the robotic end effector in fine steps in the +Y direction until the roll line reappears or returns to its correct length in the field of view of the camera, and
   iii. dithering the robotic end effector in +Y and −Y directions such that the roll line appears or lengthens when moving in +Y direction and disappears or shortens when moving in −Y direction;

l. aligning the robotic end effector with the Y axis by completing the following steps:
   i. maneuvering the robotic end effector grossly in −X direction until the pitch line disappears or shortens from the camera field of view,
   ii. maneuvering the camera in fine steps in the positive X direction until the pitch line reappears or returns to its correct length in the camera field of view, and
   iii. dithering the robotic end effector in +X and −X directions such as the pitch line appears or lengthens to its correct length when maneuvering in +X direction and disappears or shortens when maneuvering in −X direction;

m. performing yaw alignment by rotating the robotic end effector clockwise or counterclockwise about the Z axis;

n. computing distance between the robotic end effector and the camera; and o. performing Z alignment by slowly maneuvering robotic end effector in Z direction until the pitch and roll lines move out of the camera field of view.

15. A method for remotely detecting the distance between the focus of a camera and a remote object, comprising:

a. mounting a camera having a lens system, electromagnetic beam generator and oscillating mirror so that the focus of the camera lens system is in the same plane as the point of deflection of an electromagnetic beam;

b. creating a laser light line of predetermined length projected onto an object at a distance therefrom, by projecting the electromagnetic beam at a mirror oscillating through a predetermined angle;

c. positioning the camera so that the remote object is within the field of view of the camera lens system;

d. digitizing a directly received reflection of the electromagnetic beam;

e. storing the digitized data in memory; and f. computing the distance between the focus of said camera and the remote object by using:
   i. distance between the center line of the camera lens system and edge of the field view,
   ii. distance between the point where the laser light line intersects the plane of the object and the closest edge of the field of view, and
   iii. predetermined distance between the point of deflection of the electromagnetic beam and the point of intersection of the deflected electromagnetic beam and field of view.

16. A method for remotely detecting the distance between the focus of a camera and a remote object, comprising:

a. mounting a camera having a lens system, electromagnetic beam generator and oscillating mirror so that the focus of the camera lens system is in the same plane as the point of deflection of an electromagnetic beam;

b. creating a laser light line of predetermined length projected onto an object at a distance therefrom, by projecting the electromagnetic beam at a mirror oscillating through a predetermined angle;

c. positioning the camera so that the remote object is within the field of view of the camera lens system;

d. digitizing a directly received reflection of the electromagnetic beam;

e. storing the digitized data in memory; and f. computing the pitch angle of the object by using:
   i. angle between vertical deflected electromagnetic beam and center line of camera lens system,
   ii. distance between focus of camera and top point of object, and
   iii. distance between focus of camera and bottom point of object.

17. A method for remotely detecting the position and orientation of a moving object relative to a selected reference, comprising:

a. projecting an electromagnetic beam onto the surface of an object whose position is to be determined to produce a pattern of lines thereon;

b. directly sensing the pattern of lines from a position removed from said object;

c. interpreting the sensed pattern of lines as mathematical data; and d. processing the mathematical data to produce the position and orientation of said object relative to the selected reference.

18. Apparatus for determining the position and orientation of a remote object, comprising:

a. a camera;

b. means for generating an electromagnetic beam to which air is substantially transparent;

c. means for projecting said beam onto said remote object in the form of lines which are generally transverse one to another;

d. means for receiving electromagnetic beam reflections of said lines directly from said remote object; and e. means for converting said lines into data elements referenced to an x,y coordinate system.

* * * * *